United States Patent
Skiba-Szymanska et al.

(10) Patent No.: US 9,654,283 B2
(45) Date of Patent: May 16, 2017

(54) OPTICAL DEVICE AND METHOD OF FABRICATING AN OPTICAL DEVICE

(71) Applicant: KABUSHIKI KAISHA TOSHIBA, Tokyo (JP)

(72) Inventors: Joanna Krystyna Skiba-Szymanska, Cambridge (GB); Richard Mark Stevenson, Cambridge (GB); Andrew James Shields, Cambridge (GB); Jan Henning Huwer, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/855,897

(22) Filed: Sep. 16, 2015

(65) Prior Publication Data
US 2016/0118774 A1 Apr. 28, 2016

(30) Foreign Application Priority Data
Oct. 22, 2014 (GB) .................................. 1418805.6

(51) Int. Cl.
*H01S 5/34* (2006.01)
*H04L 9/08* (2006.01)
*H01S 5/10* (2006.01)
*H01S 5/183* (2006.01)

(52) U.S. Cl.
CPC ............. *H04L 9/08* (2013.01); *H01S 5/3412* (2013.01); *H01S 5/105* (2013.01); *H01S 5/183* (2013.01)

(58) Field of Classification Search
CPC ........ H01S 5/3013; H01S 5/026; H01S 5/341; H01S 5/3412; H01S 5/183; H01S 5/105; H04L 9/08
See application file for complete search history.

(56) References Cited

U.S. PATENT DOCUMENTS

| 6,177,684 B1 | 1/2001 | Sugiyama | |
| 6,816,525 B2 * | 11/2004 | Stintz | B82Y 10/00 372/45.01 |
| 2005/0161660 A1 * | 7/2005 | Ward | B82Y 20/00 257/13 |
| 2006/0071218 A1 * | 4/2006 | Takeda | B82Y 10/00 257/79 |

(Continued)

FOREIGN PATENT DOCUMENTS

| CN | 101499617 | 8/2009 |
| GB | 2488199 | 8/2012 |

(Continued)

OTHER PUBLICATIONS

Ji-Myon Lee, et al., "Growth of InAs nanocrystals on GaAs (1 0 0) by droplet epitaxy", Elsevier, *Journal of Crystal Growth*, 212, (2000) 67-73.

(Continued)

*Primary Examiner* — Xinning Niu
(74) *Attorney, Agent, or Firm* — Finnegan, Henderson, Farabow, Garrett & Dunner, LLP

(57) ABSTRACT

An optical device comprising:
a substrate;
a cavity structure on the substrate, comprising a quantum emitter in contact with one or more semiconductor layers; wherein the or all of the semiconductor layers in contact with the quantum emitter have a thickness larger than the height of the quantum emitter.

18 Claims, 16 Drawing Sheets

(56) References Cited

U.S. PATENT DOCUMENTS

| | | | |
|---|---|---|---|
| 2008/0299691 A1* | 12/2008 | Bhat | B82Y 20/00 |
| | | | 438/31 |
| 2009/0109435 A1 | 4/2009 | Kahen et al. | |
| 2010/0074293 A1 | 3/2010 | Lochmann et al. | |
| 2010/0288341 A1 | 11/2010 | Kim et al. | |
| 2011/0272671 A1 | 11/2011 | Skiba-Szymanska | |
| 2012/0076166 A1 | 3/2012 | Schliwa et al. | |
| 2012/0248403 A1* | 10/2012 | Strittmatter | B82Y 20/00 |
| | | | 257/12 |

FOREIGN PATENT DOCUMENTS

| | | |
|---|---|---|
| JP | H11-266004 A | 9/1999 |
| JP | 2004-349542 A | 12/2004 |
| JP | 2009-517870 A | 4/2009 |
| JP | 2010-177346 A | 8/2010 |
| JP | 2010-194940 A | 9/2010 |
| JP | 2011-204900 A | 10/2011 |
| JP | 2013-175755 A | 9/2013 |
| JP | 2014-110274 | 6/2014 |
| WO | WO 02/056238 | 7/2002 |
| WO | WO 2004/055900 A1 | 7/2004 |

OTHER PUBLICATIONS

Anas F. Jarjour, et al., "Cavity-enhanced blue single-photon emission from a single in Ga N/Ga N quantum dot", AIP *Applied Physics Letter*, 91, 052101-1 to 052101-3 (2007).

Combined Search and Examination Report in Great Britain Application No. GB1418805.6, 9 pages, mailed Mar. 25, 2015.

Notification of Reasons for Refusal issued in counterpart Japanese Patent Application No. 2015-183800, Oct. 24, 2016, 6 pages and machine translation.

\* cited by examiner

Droplet density: 2/µm2
Droplet diameter: 60-100nm
Shape: round

Overall dot density: 8.5/µm2
Large dot density: 2.5/µm2
Small dot density: 6/µm2
Crystal dimensions: 60 x 100nm
- 7 x 40nm
Shape: less round

OPTICAL DEVICE AND METHOD OF FABRICATING AN OPTICAL DEVICE

FIELD

Embodiments described herein relate generally to the field of optical devices, for example, photon sources, and methods for their fabrication.

BACKGROUND

Optical devices such as photon sources have applications in many fields such as quantum communication, quantum computing and quantum sensing. Photon sources based on quantum dots can be operated to output single photons or pairs of entangled photons. There is a continuing need to improve the performance of these devices.

BRIEF DESCRIPTION OF THE FIGURES

Devices and methods in accordance with non-limiting embodiments will now be described with reference to the accompanying figures in which.

DETAILED DESCRIPTION

Figure 1:
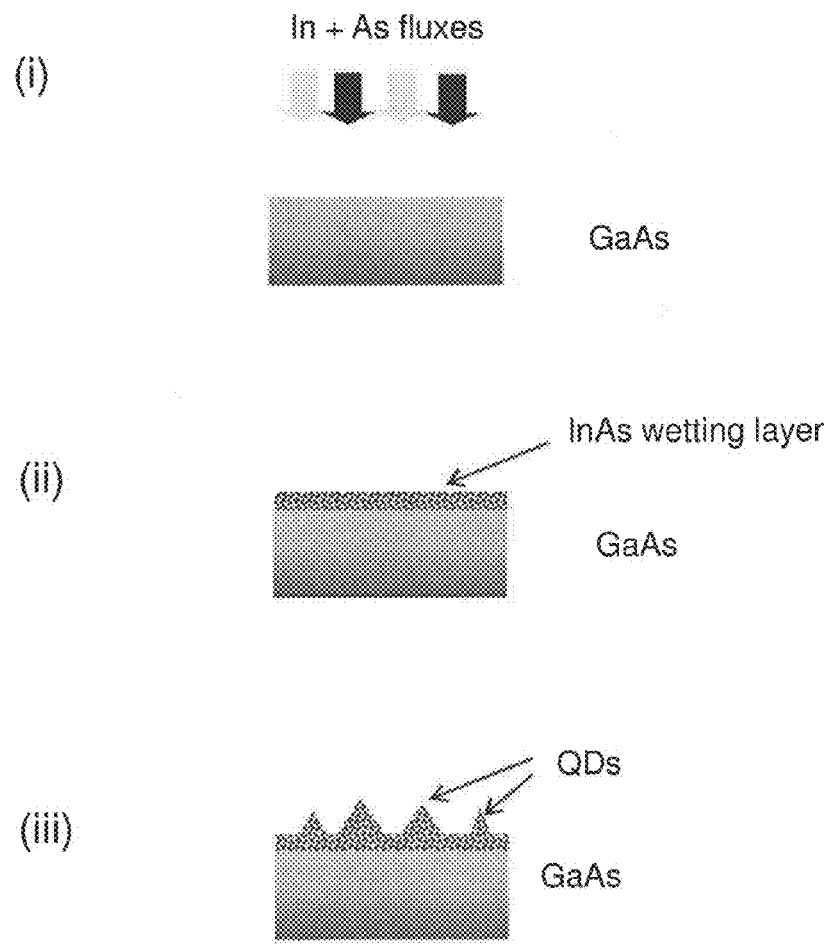
FIG. 1 is a schematic illustration of a Stranski-Krastanov growth technique.

According to one embodiment there is provided an optical device comprising: a substrate; and a cavity structure on the substrate comprising a quantum emitter in contact with one or more semiconductor layers; wherein the or all of the semiconductor layers in contact with the quantum emitter have a thickness larger than the height of the quantum emitter.

In one embodiment, the quantum emitter is a quantum dot. In one embodiment, the quantum emitter is a quantum ring. In one embodiment there is a plurality of quantum emitters.

In one embodiment, the cavity is on an atomically flat surface of the substrate. In one embodiment, the cavity structure is on a (001) orientated surface of the substrate. The substrate may have a cubic crystal structure. The substrate may have a zinc blende structure.

In one embodiment, the substrate is one of GaAs or InP and the cavity structure is formed on a 001 orientated surface of the substrate. Both GaAs and InP have a crystallographic structure of zinc blende. The zinc blende structure is a face centred cubic structure. Epitaxial growth on this type of crystal can take place on the (001) crystal plane. The (001) plane has an atomically flat surface. Growing a planar layered structure on a (001) orientated surface is aided by the atomic configuration of the (001) orientated surface. The term (001) orientated surface is conventionally used in Europe and the term (100) orientated surface is conventionally used in the US to refer to physically the same surface. The term (001) orientated surface may be used to denote any surface which is orientated with one of the cube faces of a cubic crystal. In one embodiment, the substrate has a cubic crystal structure and the cavity structure is on a surface of the substrate which is orientated with of one of the cube faces.

In one embodiment, the height of the quantum emitter is greater than 3 nm. In one embodiment, the height of the quantum emitter is greater than 3 nm and less than 12 nm. In one embodiment, the longest dimension of the quantum emitter in the plane of the layers is greater than 3 nm. In one embodiment, the longest dimension of the quantum emitter in the plane of the layers is greater than 3 nm and less than 70 nm.

The device may be a source of single photons or photon pairs. The device may be a source of entangled photon pairs.

In one embodiment, the quantum emitters are not in contact with any semiconductor layer which has a thickness less than the height of any of the quantum dots. In one embodiment, the quantum emitters are not connected laterally by any semiconductor layer which has a thickness less than the height of any of the quantum dots. In one embodiment, the quantum dots are connected laterally by a semiconductor layer having a thickness greater than the height of any of the quantum dots.

In one embodiment, the direction of the dipole axes of the quantum emitters is substantially random. In other words, the distribution of the direction of the dipole axes for all the quantum emitters in the device is random. In one embodiment, there is no 45 degree range in which over half of the angles of direction of the dipole axes of the quantum emitters lie. All 45 degree ranges contain at least one quantum emitter.

In one embodiment, the optical device comprises a quantum emitter layer having a plurality of quantum emitters with a random distribution in the direction of dipole axis, the photon source being configured to isolate the emission from a predetermined number of quantum emitters.

In one embodiment, the fine structure splitting of at least one of the quantum emitters is less than 10 μeV. In one embodiment, the fine structure splitting of at least one of the quantum emitters is less than 5 μeV. In one embodiment, the optical device comprises a quantum emitter layer having a plurality of quantum emitters with a random distribution in the fine structure splitting.

In one embodiment, the density of the quantum emitters is less than 10 emitters/$\mu m^2$. In one embodiment, the density of the quantum emitters is less than 3 emitters/$\mu m^2$. In one embodiment, the density of the quantum emitters is sufficiently low that the quantum emitters are optically isolated from each other, i.e. exciton lines coming from an individual quantum emitter are not interacting with exciton lines coming from neighbouring quantum emitters.

In one embodiment, the device comprises at least one compound selected from InAlGaAs, GaAs, AlGaAs, InAs, InAlAsP, InP or InAlAs. In one embodiment, the device comprises Ga, In, or Al. In combination with As or P. In one embodiment, the device comprises As or P.

In one embodiment, the quantum emitter is an InAs quantum dot and the substrate is GaAs. In one embodiment, the quantum emitter is an InAs quantum dot and the substrate is InP. In one embodiment, the quantum emitter is InP and the substrate is GaAs. In one embodiment, the substrate is GaAs or InP. In one embodiment, the substrate is not GaN.

In one embodiment, there is no wetting layer in contact with the quantum emitter. In one embodiment, the quantum dots are overlying and in contact with a material having a different lattice constant to the quantum emitter. In one embodiment, the difference in lattice constant is greater than 7%.

In one embodiment, the quantum emitter is optically excited and the optical device comprises a laser configured to optically excite the quantum emitter.

In one embodiment, the quantum emitter is electrically excited and the optical device further comprises electrical contacts configured to electrically excite the quantum emitter. The optical device may comprise a first doped layer and a second doped layer. A first electrical contact is contacted to the first doped layer and a second electrical contact is contacted to the second doped layer, forming a p-i-n junction. There may be a n-contact window.

In one embodiment, the first doped layer, cavity structure and second doped layer are a mesa structure on the substrate.

In one embodiment, the cavity structure further comprises a first distributed Bragg reflector and a second distributed Bragg reflector. In one embodiment, the first distributed Bragg reflector (DBR) is underlying the cavity medium and the second DBR is overlying the cavity medium. In one embodiment, the second DBR is a shorter DBR than the first DBR, forming an unbalanced microcavity.

In one embodiment, the cavity structure comprises a photonic crystal. In one embodiment, the cavity structure comprises distributed feedback gratings.

The cavity structure comprises a cavity medium between two reflecting structures. The reflecting structures may be distributed Bragg reflectors, distributed feedback gratings or regions of a photonic crystal for example.

In one embodiment, the height of the cavity medium region is $m\lambda/2n$, where $\lambda$ is similar to the wavelength of the emitted photons, n is the refractive index of the cavity material, and m is an integer. In one embodiment, $\lambda$ corresponds to the wavelength of the quantum dot emission of ~905 nm, which is reduced in GaAs due to the higher refractive index compared to air.

Where the cavity structure comprises a photonic crystal having a lattice of holes, the cavity medium comprises a region of a plurality of omitted adjacent holes along a line in the lattice. The line of holes to the right of the cavity medium region is a first reflecting structure. The line of holes to the left of the cavity medium region is a second reflecting structure, which is on the opposite side of the cavity medium region to the first reflecting structure. The regions of holes on either of the elongate sides of the cavity medium region are also reflecting structures on opposite sides of the cavity medium region.

The cavity medium comprises the one or more semiconductor layers in contact with the quantum emitter.

In one embodiment, the quantum emitter is overlying and in contact with a layer of a different material to the rest of the cavity medium. The quantum emitter is in contact with a cavity medium layer overlying and in contact with the quantum emitter and the layer of a different material underlying and in contact with the quantum emitter. Both the cavity medium layer and the layer of a different material have a thickness greater than the height of the quantum emitter.

In one embodiment, the quantum emitter is within a DWELL structure. The quantum emitters are in contact with a layer having a different material to the rest of the cavity medium only. The layer has a thickness greater than the height of the quantum emitter.

In one embodiment, the quantum emitters are capped with a layer of a different material to the rest of the cavity medium. The quantum emitter is overlying and in contact with a cavity medium layer and the layer of a different material is overlying and in contact with the quantum emitter. Both the cavity medium layer and the layer of a different material have a thickness greater than the height of the quantum emitter.

In an embodiment, the thickness of a layer is the full-width at half-maximum of the composition profile of the layer in the growth direction. In an embodiment, the thickness is the average thickness determined for the parts of the layer not perforated by quantum emitters. In an embodiment, the height of the quantum emitter and the thickness of the layer are measured using the same method.

According to one embodiment, there is provided a method for forming an optical device comprising the steps of:

forming a first reflecting structure on a substrate;
depositing isolated droplets of a first, metallic, material;
supplying a second, group V, material such that the second material reacts with the droplets of the first material to form a plurality of quantum emitters;
forming a second reflecting structure, wherein the first reflecting structure and the second reflecting structure define a cavity structure.

In one embodiment, the method further comprises the steps of:

forming a first doped layer between the substrate and the first reflecting structure;
forming a second doped layer overlying and in contact with the second reflecting structure;
contacting a first electrode to the first doped layer and a second electrode to the second doped layer to form a p-i-n junction. An n-contact window may be formed using lithography and etching.

In one embodiment, the method further comprises the steps of:
forming a first layer overlying and in contact with the first reflecting structure, on which the plurality of quantum emitters are formed;
forming a second layer overlying and in contact with the first layer and the plurality of quantum emitters, on which the second reflecting structure is formed.

In one embodiment, the first layer is formed overlying and in contact with a 001 orientated surface of a substrate.

The device can be grown by molecular beam epitaxy. A buffer layer may be formed on a 001 surface of a substrate, and the first layer formed overlying and in contact with the buffer layer.

In one embodiment, the quantum emitters are formed using the droplet growth mode technique.

In one embodiment, the first reflecting structure and second reflecting structure are distributed Bragg mirrors. The first reflecting structure and second reflecting structure may be distributed feedback gratings.

The first reflecting structure and second reflecting structure may be regions of a photonic crystal. The steps of forming the first reflecting structure and the second reflecting structure in a photonic crystal comprise forming a first layer overlying and in contact with the substrate, on which the plurality of quantum emitters are formed; forming a second layer overlying and in contact with the first layer and the plurality of quantum emitters, and forming the first and second reflecting structures by using lithography and etching to form a substantially regular lattice of holes through both the first and second layer, with a region of omitted adjacent holes along a line in the lattice forming the cavity medium region.

In one embodiment, the first layer and the second layer comprise GaAs. In one embodiment, the first material is In and the second material is As. In one embodiment, the first material is one of Ga, In, or Al, and the second material is one of As or P.

The temperature of the structure may be lowered before the first material is deposited, and raised once the second material has been supplied.

In one embodiment, the quantum emitter is a quantum dot.

In one embodiment, the quantum emitter is a quantum ring. After the step of supplying the second material, a partial capping layer of the same material as the second layer is deposited, leaving the top of the QDs exposed. The temperature is then increased to desorb the central part of the quantum dot. The second layer is then formed as before.

In one embodiment there is a plurality of quantum emitters.

In one embodiment, the quantum emitters are formed without a wetting layer. The quantum emitters are formed as droplets.

In one embodiment, a mesa structure is formed using lithography and etching.

In one embodiment, the method further comprises the steps of:
forming a first layer overlying and in contact with the first reflecting structure;
forming a third layer of a third material overlying and in contact with the first layer on which the plurality of quantum emitters are formed;
forming a second layer overlying and in contact with the third layer and the plurality of quantum emitters, on which the second reflecting structure is formed.

In one embodiment, the method further comprises the steps of:
forming a first layer overlying and in contact with the first reflecting structure;
forming a third layer of a third material overlying and in contact with the first layer on which the plurality of quantum emitters are formed;
forming a fourth layer of a third material overlying and in contact with the third layer and the plurality of quantum emitters;
forming a second layer overlying and in contact with the fourth layer on which the second reflecting structure is formed.

In one embodiment, the method further comprises the steps of:
forming a first layer overlying and in contact with the first reflecting structure, on which the plurality of quantum emitters are formed;
forming a third layer of a third material overlying and in contact with the first layer and the plurality of quantum;
forming a second layer overlying and in contact with the third layer, on which the second reflecting structure is formed.

The third material is a different material to the first layer and the second layer.

The term cavity structure refers to a structure formed by at least two reflecting structures on two opposing sides of a medium. The structure forms an optical cavity, allowing a standing wave to form inside the cavity medium. The cavity may provide optical confinement in the out of plane direction or in the in-plane direction.

The reflecting structures may be distributed Bragg reflectors (DBR). Distributed Bragg reflectors comprise in-plane periodic refractive index modulation. In one embodiment, the reflecting structures are regions of a photonic crystal. In one embodiment, the reflecting structures are distributed feedback gratings.

The term height of a quantum emitter is used to refer to the longest dimension of the quantum emitter in the out of plane direction.

The out of plane direction is the direction perpendicular to the plane of the layers. The out of plane direction is the growth direction.

The thickness of a layer is used to refer to the size of the layer in the out of plane direction.

FIG. 1(a) is a schematic illustration of a Stranski-Krastanov growth mode technique for the formation of quantum dots. For Stranski-Krastanov QDs both In and As fluxes are supplied simultaneously, forming a strained wetting latter which evolves into QDs as the thickness increases.

In (i), In and As are deposited onto a GaAs surface. The In and As are deposited simultaneously, in a single step.

In (ii), it is shown that a thin layer of InAs, referred to as the wetting layer, has formed overlying and in contact with the GaAs surface. Strain formation occurs in the wetting layer due to lattice mismatch between the InAs wetting layer and the GaAs surface.

InAs quantum dots (QDs) are formed by strain relaxation in the InAs wetting layer 103. The QDs form as "islands" on the wetting layer, as shown in (iii). The QDs have a pyramidal shaped cross-section, or a truncated pyramid cross-section The Stranski-Krastanov technique can be used to form a wetting layer on the (001) surface of a GaAs substrate. QDs form as islands on the wetting layer. The wetting layer has a different lattice constant to the material underlying and in contact with the wetting layer. The wetting layer is a layer out of which the QDs were formed. The thickness of the wetting layer is less than the height of any of the QDs.

The QDs provide high intensity emission which is accompanied by wetting layer emission. The wetting layer can act as reservoir for re-excitation, influence coherence times and cause multi photon emission at pulsed operation. This can be avoided, for example, by resonantly exciting with a laser with energy below that of the wetting layer. The wetting layer acts as a sink for electrical charge. The wetting layer will produce a signal in photoluminescence measurements. A similar signal could be caused by a second layer of dots, or other 2D feature. The design of the cavity, wavelength dependent absorption, doping, or other counter-measures can be used to quench the optical wetting layer signal.

Stranski-Krastanov QDs can be formed in structures on GaAs (001) orientated substrates. Such structures will Include a wetting layer. For QDs formed by the Stranski-Krastanov technique, the QDs will have large fine structure splitting i.e. greater than 5 peV, except for QDs which emit at certain wavelengths, for example ~885 nm. The Stranski-Krastanov QDs tend to align to the 110 and 1-10 crystal axes, 90 degrees apart.

Figure 2:
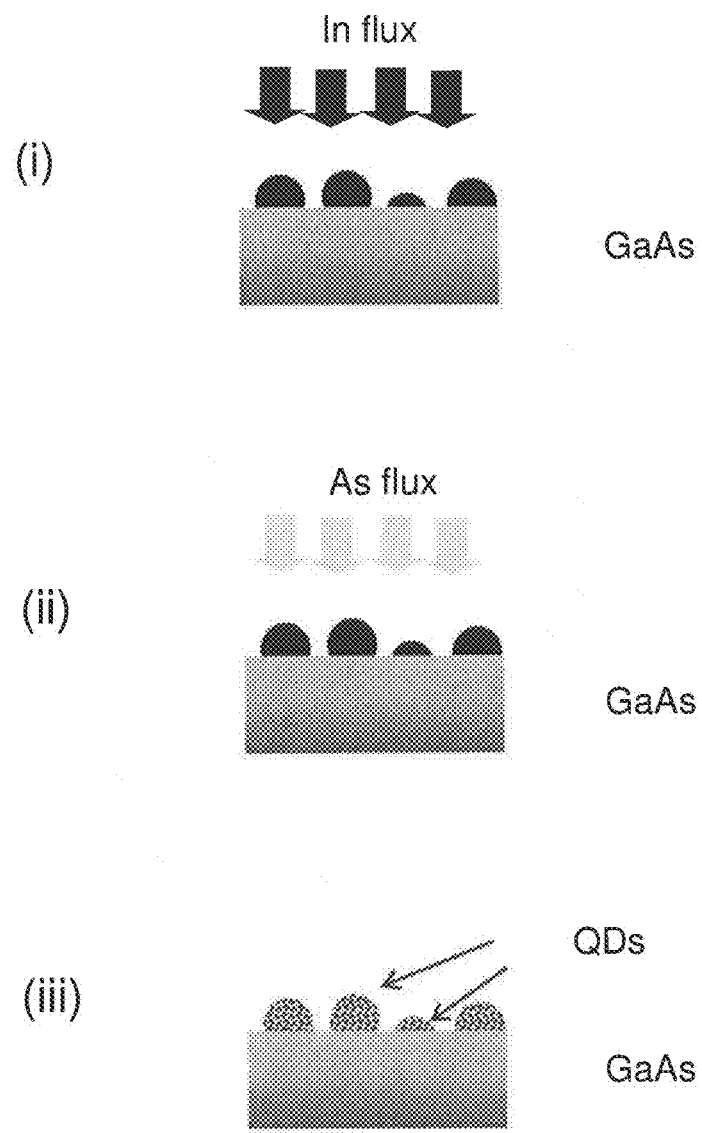
FIG. 2 is a schematic illustration of a droplet growth mode technique.

FIG. 2 is a schematic illustration of a droplet growth mode technique for the formation of quantum dots. The droplet growth mode technique is shown here for InAs QDs formed on a GaAs surface. However, the droplet growth mode technique is not limited to these materials. The droplet growth mode technique can also be used to form InGaAs, AlAs, InP or GaAs quantum dots, for example, on substrate materials such as GaAs or InP, for example.

In (i), In droplets are formed on the GaAs surface. Liquid In is deposited onto the GaAs surface. The liquid In forms strain-free droplets on the GaAs surface. The droplets have a rounded cross-section, both in plane and out of plane.

In (ii), As is deposited. The In droplets react with the As to produce InAs nanocrystals, InAs QDs form through reaction of the As with the In droplets.

In (iii), it can be seen that the InAs QDs formed through reaction of the As with the In droplets are in contact with the GaAs. There is no intermediate wetting layer between the QDs and the GaAs. The quantum dots have a rounded cross-section in the out of plane direction.

Droplet growth mode techniques can be used to form QDs on GaAs (111B) orientated substrates. These QDs have a lower FSS splitting than Stranski-Krastanov QDs.

Figure 3:
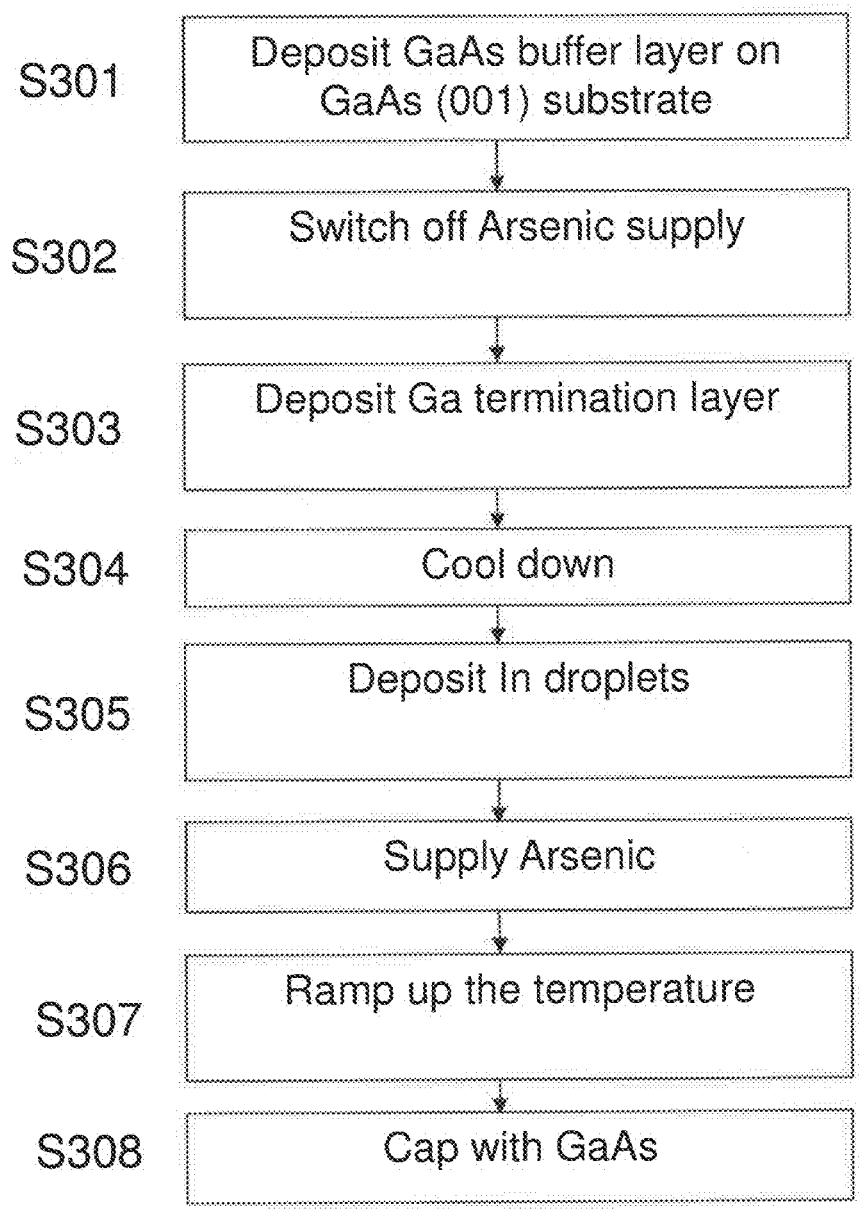
FIG. 3 is a flow chart illustrating a droplet growth mode method that can be used in a method of fabricating an optical device in accordance with an embodiment.

FIG. 3 is a flow chart illustrating a droplet growth mode method that can be used in a method of fabricating an optical device in accordance with an embodiment. The method described is for fabricating InAs QDs formed on a GaAs substrate. However, the method is not limited to these materials. The method can also be used to form InP or GaAs quantum dots for example. For InP dots, GaInP may be used as a the buffer lattice matched to GaAs substrate. For GaAs quantum dots, AlAs may be used as the buffer lattice matched to a GaAs substrate. GaInP is both buffer and matrix.

The method shown in FIG. 3 forms wetting layer free QDs. In and As fluxes are supplied separately. First, liquid Indium forms strain-free droplets on the surface of GaAs. Then Arsenic flux is supplied to crystallize the metal droplets. This results in formation of QDs. For InAs dots, $As_4$ is used rather than $As_2$, and the surface is terminated with Ga before the In droplets deposited.

An unprocessed substrate may be protected by oxides. The oxides are removed at high temperature in the vacuum chamber before the layered device is grown on the substrate. The surface of the substrate after removal of the oxides can be patchy and imperfect. A buffer layer can be grown to build a reasonably thick layer that spaces all of the important atomic layers away from the substrate/buffer interface. The interface can trap charges that would then interact with QDs or otherwise complicate the device.

Step S301 is thus "Deposit GaAs buffer layer on GaAs (001) substrate". A layer of GaAs is grown on the (001) surface of a GaAs substrate. In one embodiment, the GaAs growth temperature is 580° C., and the thickness of the buffer layer is 200 nm.

Step S302 is "Switch off Arsenic supply". The As supply used to grow the buffer layer is switched off.

Step S303 is "Deposit Ga termination layer". The Ga termination layer is deposited for a GaAs substrate and buffer layer. If an InP or AlInAs substrate is used for example, a termination layer is not necessarily deposited before forming the droplets.

Step S304 is "Cool down". The substrate is cooled. In one embodiment, the substrate is cooled to between 80° C. and 360° C. The temperature influences the density of the QDs. In general, the droplet formation temperature and droplet crystallisation temperature may be optimised for a specific quantum dot material, size, and density and therefore may be higher, equal, or lower to each other and the growth temperature of other parts of the device. For some materials, sizes and densities therefore, this step may be omitted.

The Indium cell from which the in is supplied is kept at a high temperature throughout the process. Only the substrate is cooled in this step.

Step S305 is "Deposit In droplets". Liquid In is deposited on the Ga termination layer.

The droplets form metallic blobs.

Step S306 is "Supply Arsenic". Arsenic is deposited on the In droplets and the Ga termination layer. The parameters of the QDs may differ depending on the As flux or arrival rate. As is supplied in the form of $As_4$ for this type of growth.

Step S307 is "Ramp up the temperature". When the temperature is increased, the As reacts with the In droplets. The droplets crystallise and form QDs. In one embodiment, the system is heated to around 500° C. In general, the droplet formation temperature and droplet crystallisation temperature may be optimised for a specific quantum dot material, size, and density and therefore may be higher, equal, or lower to each other and the growth temperature of other parts of the device. For some materials, sizes and densities therefore, this step may be omitted. For this example, the QDs crystallise after the temperature is increased. A "crust" forms as an outer shell on the droplet when As is supplied. With increasing temperature, the droplet will start "crusting" inwards, towards the inside of the droplet. In one embodiment, the temperature is increased sufficiently that the droplets are fully crystallised, but there is no desorb from the surface.

In one embodiment, the method includes the step of waiting for several minutes between steps S306 and S307.

Step S308 is "Cap with GaAs". A layer of GaAs is deposited overlying and in contact with the Ga termination layer and the QDs.

For InP QDs, the steps for droplet formation are: switch off P, cool down, deposit In droplets, open P supply and ramp the temperature up. For InP QDs it is possible to use $As_4$ or $As_2$ and the step of terminating the surface with Ga before In droplets are deposited may be omitted.

Figure 4A:
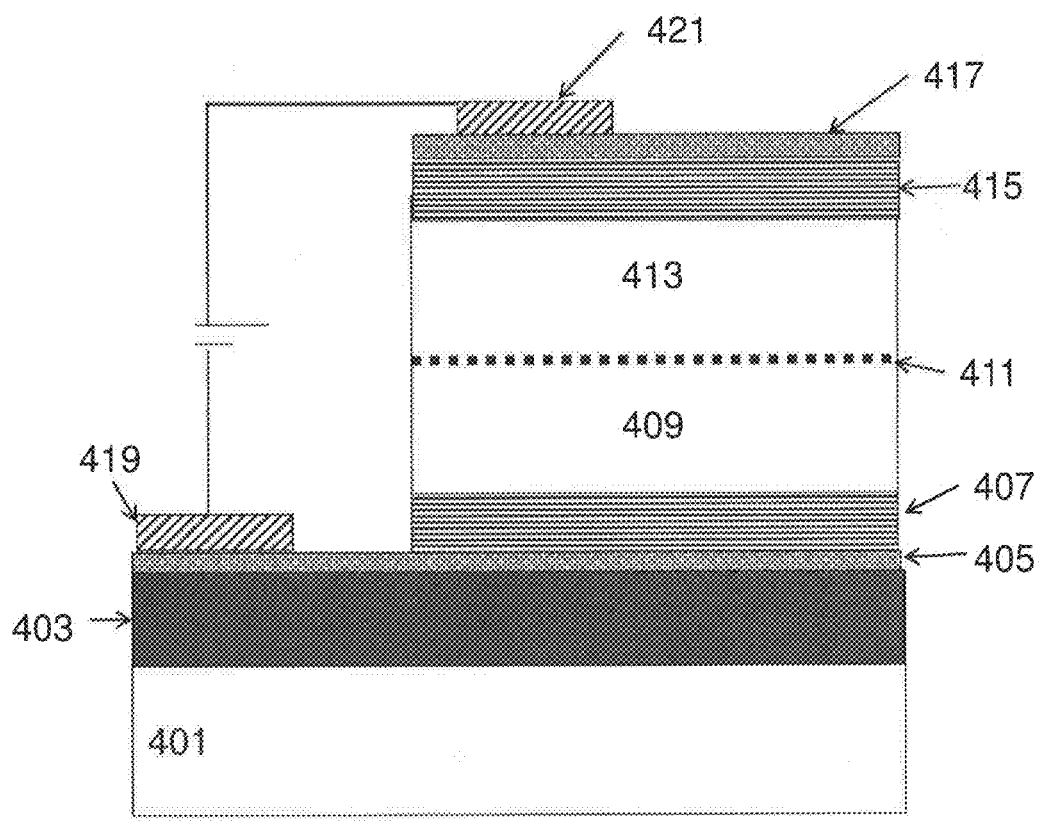
FIG. 4(a) is a schematic illustration of an optical device in accordance with an embodiment, comprising an electrically excited cavity.

FIG. 4(a) is a schematic illustration of an optical device in accordance with an embodiment. The device comprises an electrically excited cavity comprising a plurality of quantum dots. The optical device is fabricated using molecular beam epitaxy (MBE).

The device is formed on a substrate 401. In this example, the substrate is GaAs, but other substrates could be used. The device is formed on the (001) surface of the substrate. Growing a planar layered structure on a (001) surface is aided by the atomic configuration of the (001) surface. The 001 surface is an even or uniform, flat surface. The surface is flat on the atomic scale. Growth of layered structures such as DBRs involves growing multiple repetitions of thin material layers. This is aided by growing the layers on an even surface. On a (001) orientated surface, high quality, defect free, monolayer atomic growth can be achieved, i.e. complete layer by layer of Gallium and Arsenic atoms in turn. This facilitates the creation of mirrors, because the interface between the different GaAs and AlAs $\lambda/4$ layers is atomically flat. Growing high quality mirrors of well-defined thickness, with flat interfaces is possible, resulting in high quality mirror performance. MBE growth on a (001) orientated surface produces good quality epilayers. MBE growth on a (001) orientated surface inhibits antiphase, twinning, and faceting defects.

A buffer layer 403 is overlying and in contact with the substrate 401. A doped layer 405 is overlying and in contact with the buffer layer 403. In this particular example, the doped layer 405 is n-doped GaAs. A lower distributed Bragg reflector 407 is overlying and in contact with a portion of the doped layer 405. The lower distributed Bragg reflector 407 is an example of a reflecting structure. In one embodiment, it is formed by multiple pairs of high and low refractive index semiconductor, each with optical thickness of $\lambda/4$, where $\lambda$ is the wavelength of the emission from the quantum dots. In one embodiment, the lower distributed Bragg reflector comprises 18 repeats of alternating Si-doped n-type GaAs and $Al_{0.98}Ga_{0.02}As$.

A GaAs layer 409 is overlying and in contact with the lower distributed Bragg reflector 407.

A plurality of QDs 411 are overlying and in contact with the GaAs layer 409. GaAs layer 409 is the lower part of the medium in the cavity. GaAs layer 413 is overlying and in contact with the plurality of QDs 411 and the GaAs layer 409. GaAs layer 413 is the upper part of the medium in the cavity structure. Although in this example, the device is based on a GaAs layer having InAs QDs, other materials could be used, for example, InP or GaAs QDs. InAs has a relatively low bandgap, and can be used for telecom device manufacture. When grown on GaAs substrates, InAs QDs are highly strained, which shortens the emission wavelength. When grown on InP substrates, there is very little strain, which allows longer wavelength emission. Devices formed with InAs QDs on an InP substrate can emit photons in the telecommunications wavelength band.

An upper distributed Bragg reflector 415 is overlying and in contact with the GaAs layer 413. In one embodiment, with InAs dots in GaAs, the DBRs are GaAs/AlGaAs stacks. In one embodiment, the lower DBR comprises 16 bottom pairs and the upper DBR comprises 6 pairs. The thicknesses depend on the Al concentration, which determines the refractive index of AlGaAs.

A heavily doped layer 417 is overlying and in contact with the upper distributed Bragg reflector 415. In this example, the doped layer is p+-doped GaAs. Layer 417 has a thickness optimised to maintain high reflectivity of mirror structure 415. For example, it may be very thin, i.e. 5 nm, or may be an integer of $\lambda/2n$. The doped layer 405, lower distributed Bragg reflector 407, GaAs layer 409, plurality of QDs 411, GaAs layer 413, upper distributed Bragg reflector 415 and heavily doped layer 417 together form a mesa structure on the substrate 401 and buffer layer 403. In order to fabricate the mesa, the layered structure is etched, by patterning the structure using a technique such as photolithography or electron beam lithography and then etching the desired shape using either a dry etching technique or a wet etching technique, through the photolithography or electron beam lithography mask. The etch is performed down to the buffer layer 403. The photolithography or electron lithography mask is then removed.

An n-type electrode 419 is contacted to the doped layer 405. The contact can be made to any n-type layer, however, by etching through the bottom DBR the device performance is maximised. A p-type electrode 421 is contacted to the doped layer 417. The n-type electrode 419 and p-type electrode 421 form a p-i-n junction in a direction perpendicular to the plane of the layers, i.e. in the stacking direction of the layers.

In one embodiment, the p-i-n junction can be reversed, such that the n-type electrode forms a contact above the layers. For a reversed p-n junction, the n-doped GaAs layer 405 will instead be p-doped, and the p-doped GaAs layer 417 will be n-doped. This will form an n-i-p junction.

The QDs 411 are in contact with the GaAs layer 409 and the GaAs layer 413 only. The thickness of GaAs layer 409 and the thickness of GaAs layer 413 are greater than the height of the QDs 411.

During growth or annealing of semiconductor layers intermixing occurs. This results in abrupt boundaries between layers of different composition becoming graded. For example, the interface between a layer of GaAs and a layer of InAs intermixes to become a graded interface that transitions from GaAs, to InGaAs, to InAs, with increasing In content as the position along the growth direction. Furthermore, intermixing of thin layers with their surrounding material may result in peak concentration less than as deposited. For example, a thin layer of InAs within GaAs would intermix so that the composition transitions smoothly between GaAs, lower indium content InGaAs, to higher indium content InGaAs, to lower indium content InGaAs, to GaAs. These effects mean that any measurement of the thickness of a layer should account for intermixing.

In an example of a method of measuring a thickness of a layer, the thickness of a layer may be determined by first measuring or estimating the composition of the layer as a function of distance along the growth axis, or growth direction, using standard STM or TEM microscopy techniques. Then, the thickness may be measured as the full-width at half-maximum of this composition profile.

The atomic nature of thin semiconductor layers means that occasional atoms of a layer material may be significantly displaced due to intermixing and diffusion. Therefore in-plane averaging may be applied over different regions of the layer to determine average values for thickness, including average values for the composition profile. For non-continuous layers, such as those perforated by quantum dots, averaging or profiling should occur only over the relevant parts of the layer.

When comparing the thickness, or maximum height of quantum dots to a layer they are in contact with, intermixing will affect the quantum dot and contacting layers similarly.

Depending on the carrier population, the injection of carriers into the quantum dot region results in the creation of excitons or multi-exciton complexes, for example, biexcitons.

An exciton is formed when there is a bound state between a small number of electrons in the conduction band and holes in the valence band, radiative decay occurring when one hole and one electron recombine resulting in the emission of a photon. Due to the atomic-like nature of quantum dots, the radiative recombination of excitons leads to the emission of single and indistinguishable photons.

The emission of entangled photon pairs can occur via the radiative biexciton cascade. The injection of two electrons and two holes into the active region with the QD leads to the formation of a biexciton (two electron-hole pairs). Under certain circumstances, the biexciton recombines radiatively emitting a pair of entangled photons. Biexcitons can be created simply by increasing the excitation power, i.e. by increasing the voltage. The biexciton state can emit "a blexciton photon" leaving one electron and one hole in a "(charge-neutral) exciton" state. This electron and hole then recombine to emit an "exciton" photon, leaving the dot empty. Through control of the properties of the exciton state these two photons can be entangled.

The light emitted from the QDs is vertically confined by the upper distributed Bragg reflector 413 and the lower distributed Bragg reflector 405. The device is designed to enhance light emission in the out of plane direction. In alternative embodiments, the optical device is an in-plane optimised device. The upper distributed Bragg reflector 413 and lower distributed Bragg reflector are reflecting structures that form a cavity structure. Such a cavity structure can be easily grown on the (001) surface of a GaAs substrate. Good quality cavities can be grown on a (001) substrate.

Distributed Bragg reflectors (DBRs) comprise in-plane periodic refractive index modulation. By selecting appropriate structures with modulation in refractive index, it is possible to control the optical mode in devices. This is advantageous for example to increase device efficiency, or reduce the photon emission time. Also, modulations in refractive index that are quasi-periodic, i.e. which deviate slightly from precise periodicity, may be used.

The structure may comprise QDs with small fine structure splitting in a good quality cavity with no wetting layer present.

The absence of the wetting layer can be detected by milling a lamella and performing a cross sectional TEM or STEM measurement, quantifying the amount of Indium along the growth direction, i.e. the out of plane direction. When there is no wetting layer present, the presence of In will only be detected if the TEM or STEM analysis is performed over an area comprising a QD. If no wetting layer is present, there will be areas in which In is not detected at any point along the growth direction, i.e. the areas between the QDs. For a device comprising a wetting layer, for the entire device, In will be detected at some point along the growth direction. It would be possible to identify a wetting layer in a similar way even if the barrier material was InGaAs, by detecting an increase in the In composition, which would signify a wetting layer.

The QD density in the device can be sufficiently low that an opaque mask on the top of the mesa to optically isolate single dots is not required. In other words, the density of the QDs is sufficiently low that the QDs are optically isolated from each other. For QDs that are optically isolated, exciton lines coming from an individual dot have spectra that have high signal to background ratio. In one embodiment, the signal to background ratio is greater than 10. Exciton lines coming from an individual QD are not interacting with exciton lines coming from neighbouring QDs. The optical spectrum is clean.

Figure 4B:
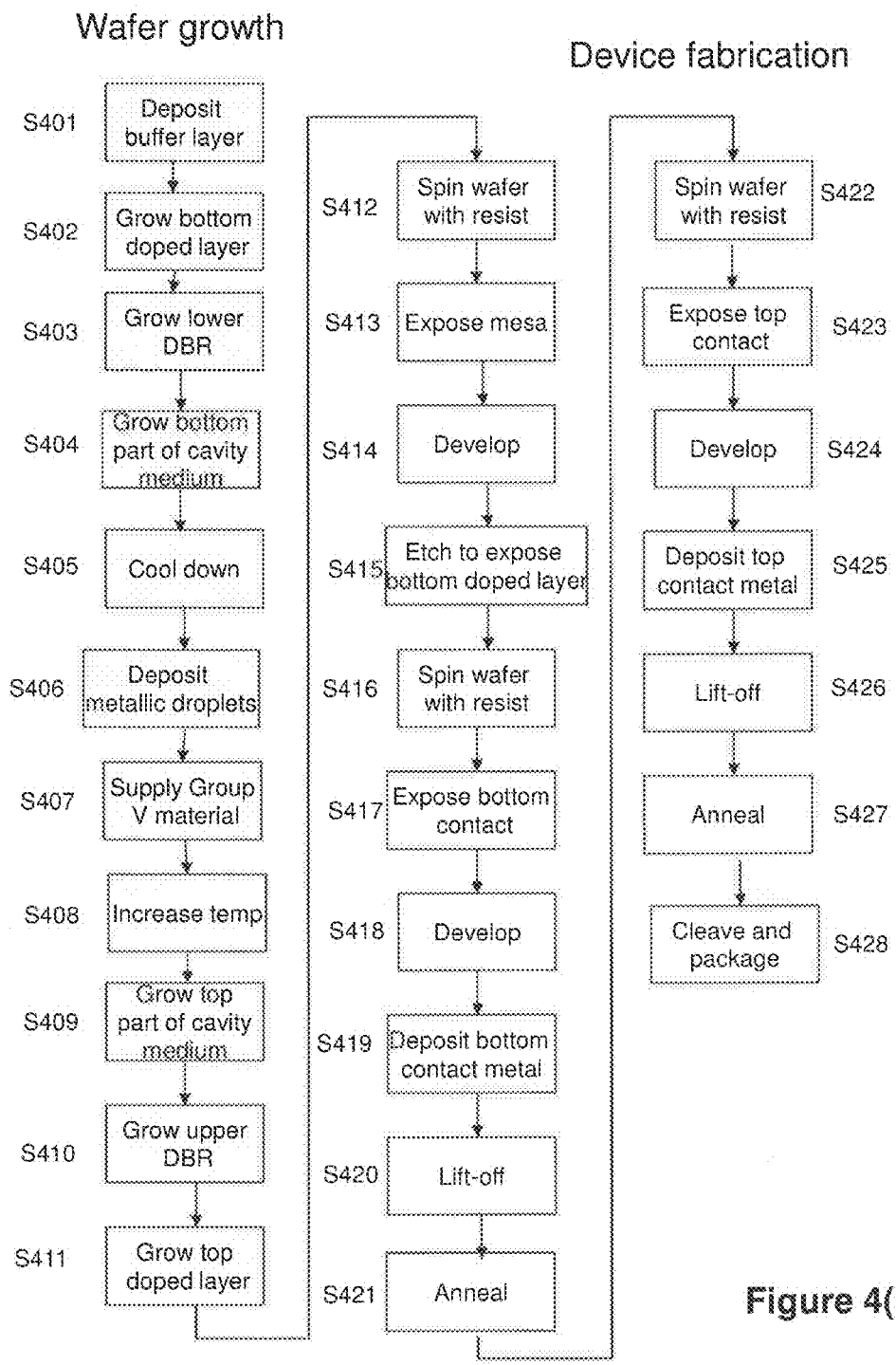
FIG. 4(b) is a flow chart illustrating a method of fabricating an optical device comprising an electrically excited cavity in accordance with an embodiment.

FIG. 4(b) is a flow chart showing a method fabricating an optical device in accordance with an embodiment. The method can be used to fabricate the device shown in FIG. 4(a).

Step S401 is "Deposit buffer layer". A buffer layer is deposited on the (001) surface of a substrate.

Step S402 is "Grow bottom doped layer". A doped layer is grown overlying and in contact with the buffer layer.

Step S403 is "Grow lower DBR". A distributed Bragg reflector is grown overlying and in contact with the bottom doped layer.

Step S404 is "Grow bottom part of cavity medium". A lower portion of the medium that is located between the two reflecting structures in the cavity structure is grown.

Step S405 is "Cool down". The temperature of the system is decreased to a sufficiently low value that the metallic material deposited in step S406 will droplets on the surface. In general, the droplet formation temperature and droplet crystallisation temperature may be optimised for a specific quantum dot material, size, and density and therefore may be higher, equal, or lower to each other and the growth temperature of other parts of the device. For some materials, sizes and densities therefore, this step may be omitted.

Step S406 is "Deposit metallic droplets". The metallic material out of which the QDs will form is deposited on the bottom part of the cavity. The material forms droplets, or metallic "blobs".

Step S407 is "Supply Group V material". The Group V material that will crystallise the metallic material to form the QDs is supplied.

Step S408 is "Increase temp". The temperature is ramped up such that the droplets crystallise. In general, the droplet formation temperature and droplet crystallisation temperature may be optimised for a specific quantum dot material, size, and density and therefore may be higher, equal, or lower to each other and the growth temperature of other parts of the device. For some materials, size and density therefore, this step may be omitted.

Step S409 is "Grow top part of cavity medium". The higher portion of the medium located between the two reflecting structures is grown on overlying and in contact with the bottom part and the QDs on the surface of the bottom part.

Step S410 is "Grow upper DBR". The upper DBR is grown overlying and in contact with the top part of the cavity.

Step S411 is "Grow top doped layer". The top doped layer is grown overlying and in contact with the upper DBR. The top doped layer is of opposite polarity to the bottom doped layer.

Step S412 is "Spin wafer with resist". A positive photoresist may be used. The resist is spun on top of the top doped layer.

Step S413 is "Expose mesa". For a photoresist, UV exposure is used. For a positive photo-resist, the area of the surface of the top doped layer which will form the mesa is not exposed.

Step S414 is "Development". A developer is applied. For a positive photo resist, during development the exposed areas of the resist, i.e. the surroundings of the mesa region, are removed.

Step S415 is "Etch to expose bottom doped layer". The surroundings of the mesa region are then etched using wet or dry etching. For wet etching of GaAs-based mesas for example, a mixture of H2SO4-H2O2-H2O (sulfuric acid-hydrogen peroxide-water) can be used. For dry etching, a plasma based on silicon tetrachloride or chlorine gas can be used. The device is etched down to expose the bottom doped layer.

Step S416 is "Spin wafer with resist". A resist is spun on top of the layered structure.

Step S417 is "Expose bottom contact". The region on the bottom doped layer on which the AuGeNi contact is to be deposited are exposed.

Step S418 is "Develop". The resist is developed to remove the resist in these regions.

Step S419 is "Deposit bottom contact metal". For an n-doped GaAs layer, AuGeNi is deposited as the bottom contact metal. A layer of the AuGeNi is deposited across the entire structure.

Step 420 is "Lift-off". The regions of the resist which were not exposed are removed.

This removes the AuGeNi on top of these regions at the same time, leaving AuGeNi in the desired contact region only.

Step S421 is "Anneal". Thermal treatment at moderate temperatures can be used to achieve good ohmic contact between the contact metal and the bottom doped layer. In one embodiment, the device is annealed at 420° C.

Step 422 is "Spin wafer with resist". A new resist is spun on top of the entire structure.

Step 423 is "Expose top contact". The region of the top doped layer on which the top metal contact is to be deposited is exposed.

Step S424 is "Develop". The resist is developed to remove the resist in this region.

Step S425 is "Deposit top metal contact". The top contact metal is then evaporated across the entire structure. For a GaAs structure. Al can be used as the top contact metal. However, Al degrades and oxidises quickly and forms a so-called quasi Ohmic contact. TiAu can be used as the top contact metal, however it also forms a quasi Ohmic contact. In practice, a quasi Ohmic contact will have several hundred Ohms resistance compared to 20 Ohms for the case of a proper Ohmic contact. For a quasi Ohmic contact, the characteristic will not be linear.

The regions of the resist that were not exposed in steps S417 or S421 are then removed (which removes the metal on top of the regions too). This leaves the top and bottom metal contacts in the desired regions only.

Step S424 is "Anneal". Thermal treatment at moderate temperatures can be used to achieve good ohmic contact between the top contact metal and the top doped layer.

Step S425 is "Cleave and package". For full wafer processing at this stage, the wafer is cleaved into chips and each individual chip is packaged. Cleaving can be performed using a diamond scriber, or the wafer can be diced mechanically. Packaging involves gluing a single chip onto a header and bonding the contacts to provide larger and more robust access to device electrodes.

In one embodiment, the quantum emitter is a quantum ring. Quantum rings can be treated as a type of quantum dot, and they share many essential characteristics. In order to fabricate quantum rings, after growth and crystallisation of quantum dots as described above, a partial capping layer of the cavity medium material is deposited, leaving the top of the QDs exposed. Then, the temperature is increased to desorb the central part of the quantum dot. The areas covered by the capping layer remain, whilst the exposed top of the QD is redistributed to form a ring, together with some of the material beneath it. The structure is then completed as before.

Figure 5A:
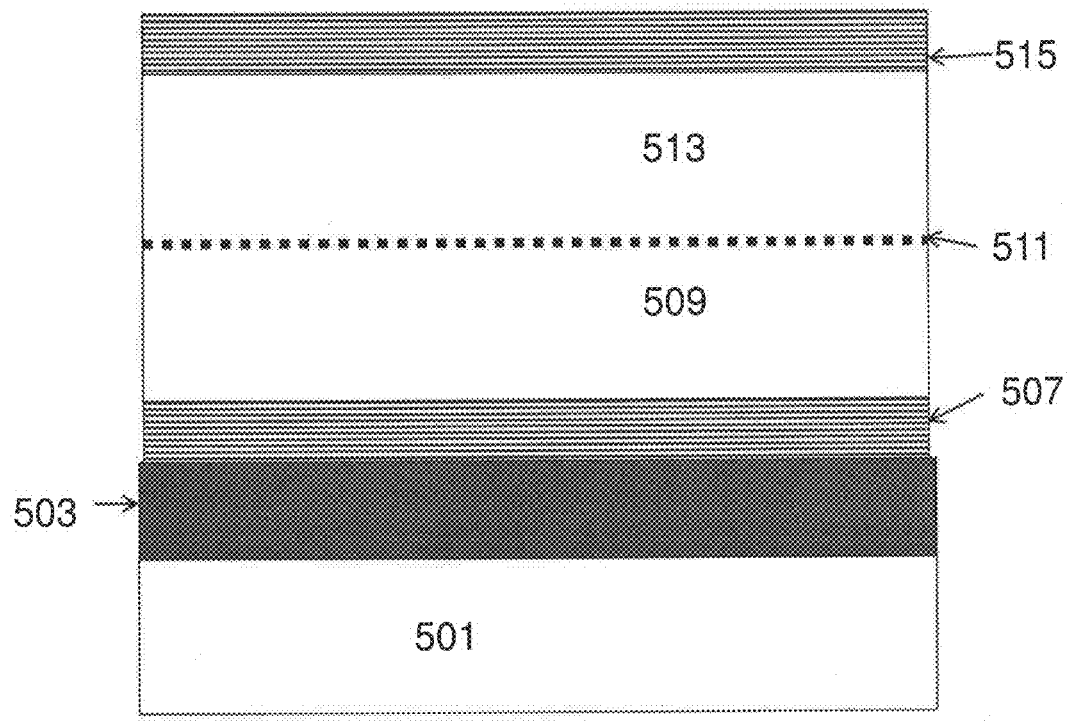
FIG. 5(a) is a schematic illustration of an optical device comprising an optically excited cavity in accordance with an embodiment.

FIG. 5 is a schematic illustration of an optical device in accordance with an embodiment. The device comprises an optically excited cavity comprising a plurality of quantum dots. The optical device is fabricated using molecular beam epitaxy.

The device is formed on a substrate 501. In this example, the substrate is GaAs, but other substrates could be used. The device is formed on the (001) surface of the substrate. A buffer layer 503 is overlying and in contact with the substrate 501. A lower distributed Bragg reflector 507 is overlying and in contact with a portion of the buffer layer 503. The lower distributed Bragg reflector 507 is an example of a reflecting structure. A GaAs layer 509 is overlying and in contact with the lower distributed Bragg reflector 507. GaAs layer 509 is the bottom part of the cavity medium.

A plurality of QDs 511 are overlying and in contact with the GaAs layer 509. GaAs layer 513 is overlying and in contact with the plurality of QDs 511 and the GaAs layer 509. GaAs layer 509 is a lower part of the medium in the cavity structure. GaAs layer 513 is the upper part of the medium in the cavity structure. Although in this example, the device is based on a GaAs layer having InAs QDs, other materials could be used, for example, InP or GaAs QDs. Devices formed with InAs QDs on an InP substrate can emit photons in the telecommunications wavelength band. An upper distributed Bragg reflector 515 is overlying and in contact with the GaAs layer 513.

The QDs 511 are in contact with the GaAs layer 509 and the GaAs layer 513 only. The thickness of GaAs layer 509 and the thickness of GaAs layer 513 are greater than the height of the QDs 511.

The device is planar in this example, but can instead be processed into a pillar, using similar techniques as those used to etch the mesa structure for the device shown in FIG. 4.

The quantum dots in this device are optically excited to produce photons. Carriers are injected into the quantum dot by optical excitation.

The light emitted from the QDs is vertically confined by the upper distributed Bragg reflector 413 and the lower distributed Bragg reflector 405. The upper distributed Bragg reflector 413 and lower distributed Bragg reflector are reflecting structures that form a cavity structure. Such a cavity structure can be easily grown on the (001) surface of a GaAs substrate. The cavity will be good quality.

The structure comprises QDs with small fine structure splitting in a good quality cavity with no wetting layer present.

The QD density in the device can be sufficiently low that an opaque mask on the top of the mesa to optically isolate single dots is not required. In other words, the density of the QDs is sufficiently low that the QDs are optically isolated from each other.

Figure 5B:
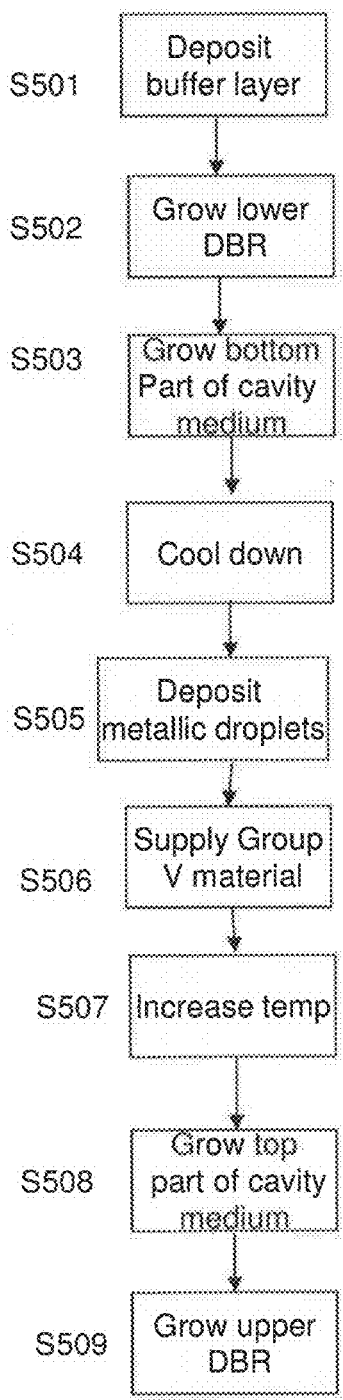
FIG. 5(b) is a flow chart illustrating a method of fabricating an optical device comprising an optically excited cavity in accordance with an embodiment.

FIG. 5(b) is a flow chart showing a method fabricating an optical device in accordance with an embodiment. The method can be used to fabricate the device shown in FIG. 5(a).

Step S501 is "Deposit buffer layer". A buffer layer is deposited on the (001) surface of a substrate.

Step S502 is "Grow lower DBR". A distributed Bragg reflector is grown overlying and in contact with the bottom doped layer.

Step S503 is "Grow bottom part of cavity medium". A lower portion of the medium that is located between the two reflecting structures in the cavity structure is grown.

Step S504 is "Cool down". The temperature of the system is decreased to a sufficiently low value that the metallic material deposited in step S406 will droplets on the surface. In general, the droplet formation temperature and droplet crystallisation temperature may be optimised for a specific quantum dot material, size, and density and therefore may be higher, equal, or lower to each other and the growth temperature of other parts of the device. For some materials, sizes and densities therefore, this step may be omitted.

Step S505 is "Deposit metallic droplets". The metallic material out of which the QDs will form is deposited on the bottom part of the cavity. The material forms droplets, or metallic "blobs".

Step S506 is "Supply Group V material". The Group V material that will crystallise the metallic material to form the QDs is supplied.

Step S507 is "Increase temp". The temperature is ramped up such that the droplets crystallise. In general, the droplet formation temperature and droplet crystallisation temperature may be optimised for a specific quantum dot material, size, and density and therefore may be higher, equal, or lower to each other and the growth temperature of other parts of the device. For some materials, sizes and densities therefore, this step may be omitted.

Step S508 is "Grow top part of cavity medium". The higher portion of the medium located between the two reflecting structures is grown on overlying and in contact with the bottom part and the QDs on the surface of the bottom part.

Step S509 is "Grow upper DBR". The upper DBR is grown overlying and in contact with the top part of the cavity.

Further steps may be performed in order to process the structure into a pillar.

In one embodiment, the quantum emitter is a quantum ring. Quantum rings can be treated as a type of quantum dot, and they share many essential characteristics. In order to fabricate quantum rings, after growth and crystallisation of quantum dots as described above, a partial capping layer of the cavity medium material is deposited, leaving the top of the QDs exposed. Then, the temperature is increased to desorb the central part of the quantum dot. The structure is then completed as before.

FIGS. 6 to 11 show experimental results for InAs QDs formed on a GaAs (001) orientated substrate using the method described in relation to FIG. 3.

Figure 6:
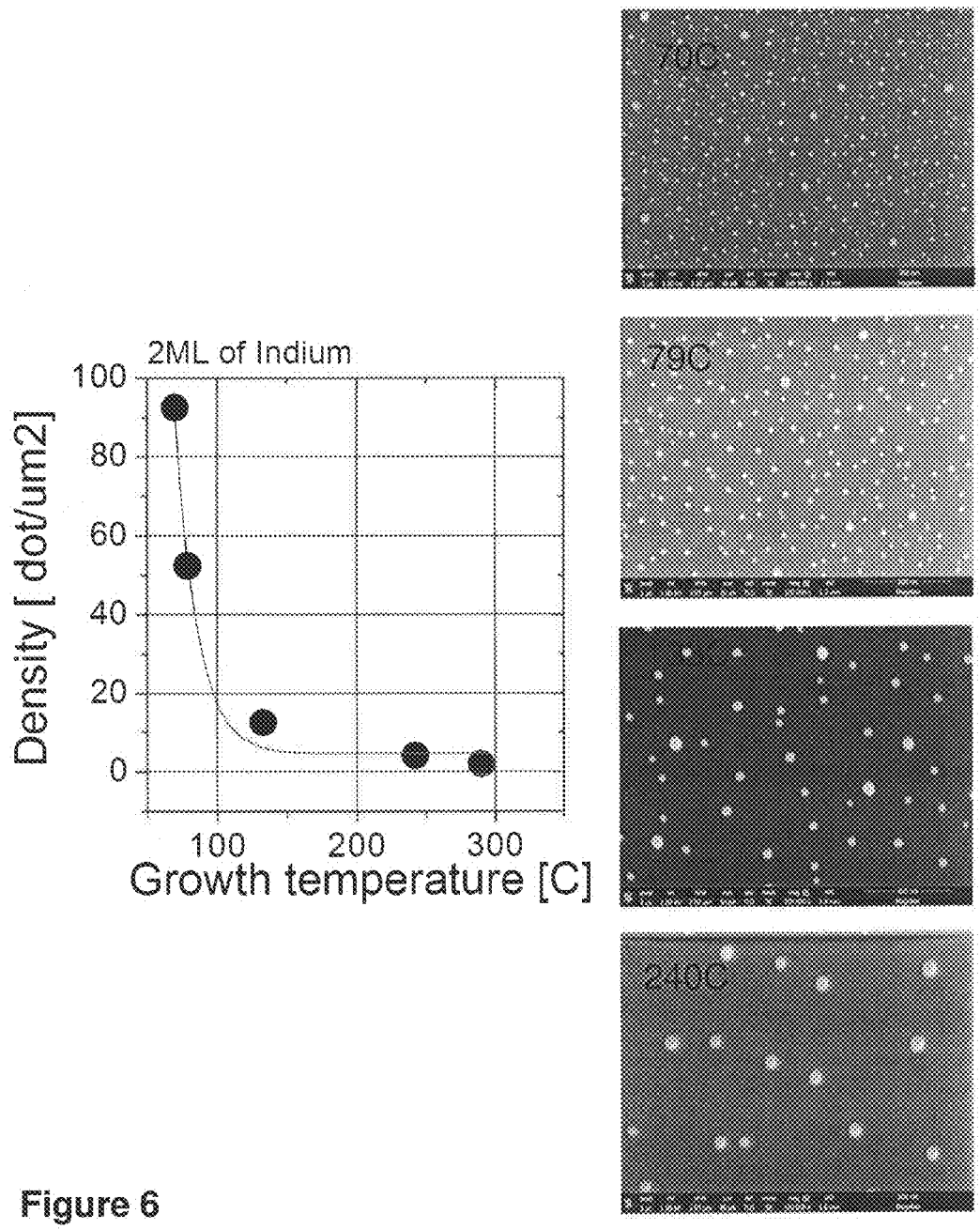
FIG. 6 is a graph of the density of the QDs (in dots/μm2) against the growth temperature in ° C., along with AFM images of the surface.

FIG. 6 shows the dependence of the droplet (uncrystallised dot) density on the droplet deposition temperature. 2 ML of Indium were deposited at each temperature. FIG. 6 is a graph of the density of the QDs (in dots/$\mu m^2$) against the growth temperature in ° C. The growth temperature is the In deposition temperature, i.e. the temperature to which the substrate is cooled to in step S304. The total amount of In deposited on the surface was 2 monolayers (2 ML). The density decreases as the growth temperature increases. At above 100° C., for 2 ML of IN deposited, the density of the QDs is less than 20 dots/$\mu m^2$. At above 200° C., the density of the QDs is less than 10 dots/$\mu m^2$ for 2 ML of Indium deposited.

FIG. 6 also shows four AFM images of the wafer surface. Each AFM image zooms in to a 2×2 $\mu m^2$ section of the surface. The first image is at 70° C., the second image is at 79° C., the third image is at 133° C., the fourth image is at 240° C. The droplet density can be seen to decrease as the temperature increases.

Figure 7:
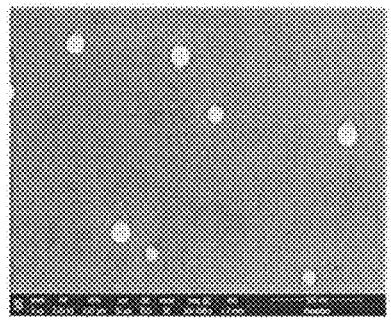
FIG. 7 shows images of In droplets before and after crystallisation.
Figure 7:
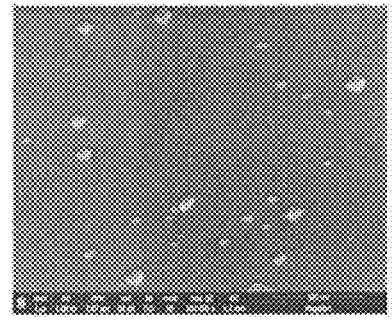

FIG. 7 shows an image of the In droplets formed by the droplet growth technique before crystallisation (i.e. at step S305), and an image of the In droplets after crystallisation (i.e. at step S307). The image before crystallisation is the left hand image, the image after crystallisation is the right hand image. The total amount of In deposited on the surface was 2 monolayers (2 ML). The images show a plan view, i.e. looking down onto the surface In the left hand image, taken before crystallisation, the droplet density is 2 dots/$\mu m^2$. The diameter of the droplets is between 60 to 100 $\mu$m. The droplets have a rounded shape. The droplets have a rounded shape when viewed along the out of plane direction. The cross-sectional profile of the droplets in the out of plane direction is dome-shaped.

In the right hand image, taken after crystallisation, the overall dot density is 8.5 dots/$\mu m^2$. During crystallisation, the In droplets soak in Arsenic. One possible cause for the increase in density after crystallisation is that the QDs may have a "critical volume" (which may be around 40000 $nm^3$). This is a maximum volume that a crystallised QD can reach. When the volume exceeds this value it explodes into multiple smaller dots. By depositing less indium and then crystallising, it is possible to reduce this effect. For less 1.6 ML of Indium the QDs do not explode (depending on the As overpressure).

The QDs after crystallisation have a larger variation in size than before crystallisation. The AFM image shows some kind of bi-modal distribution. There are QDs that are clearly larger than others. The density of the large dots is 2.5 dots/$\mu m^2$. The density of the small dots is 6 dots/$\mu m^2$. The dimensions of the droplets are between 60×100 $\mu$m to 7×40 $\mu$m. The droplets have a less rounded, more angular shape than before crystallisation. This is because when the droplets crystallize, the inherent crystal asymmetry which leads to some distortion of the rounded shape.

The QDs formed by the droplet growth mode technique can have ultra-low dot density of around 2 dots/$\mu m^2$.

Figure 8:
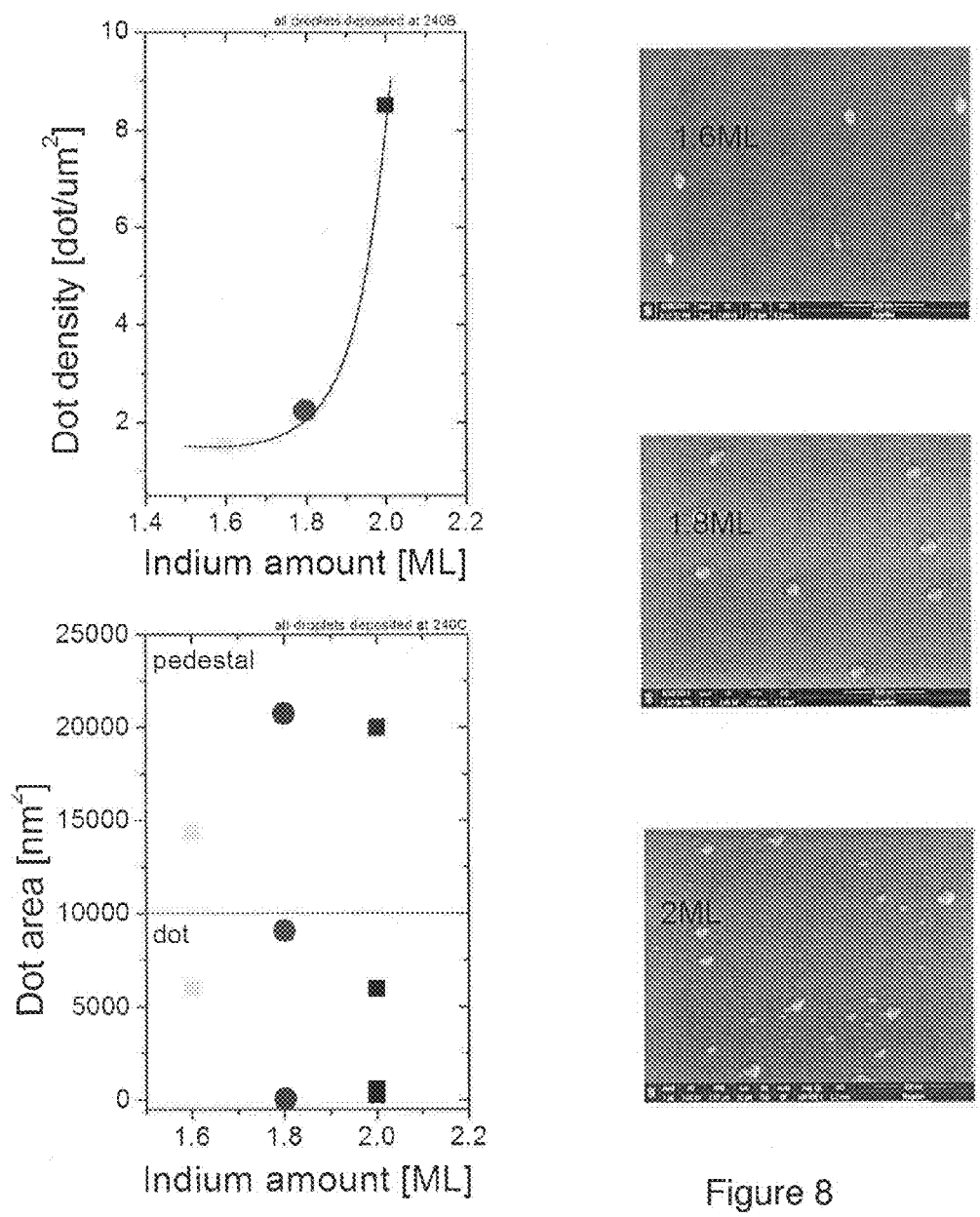
FIG. 8 shows the variation in the QDs with varying In amount.

FIG. 8 shows the variation in the QDs with varying In amount.

The first graph shows the dot density in dots/$\mu m^2$ against the amount of In deposited in monolayers (ML). The droplet density at 1.6 ML is less than 2 dots/$\mu m^2$. The droplet density increases with increasing amounts of In. The droplet density at 2 ML is over 8 dots/$\mu m^2$.

The second graph shows the analysis of the droplet size in $nm^2$ and volume of the QDs against the amount of In deposited in ML.

The series of three images on the left hand side shows a plan view, looking down onto the surface, of the droplets. The first image is for 1.6 ML of In deposited, the second image is for 1.8 ML of In deposited and the third image is for 2 ML of In deposited. The density of the dots increases with increasing amounts of In.

Figure 9:
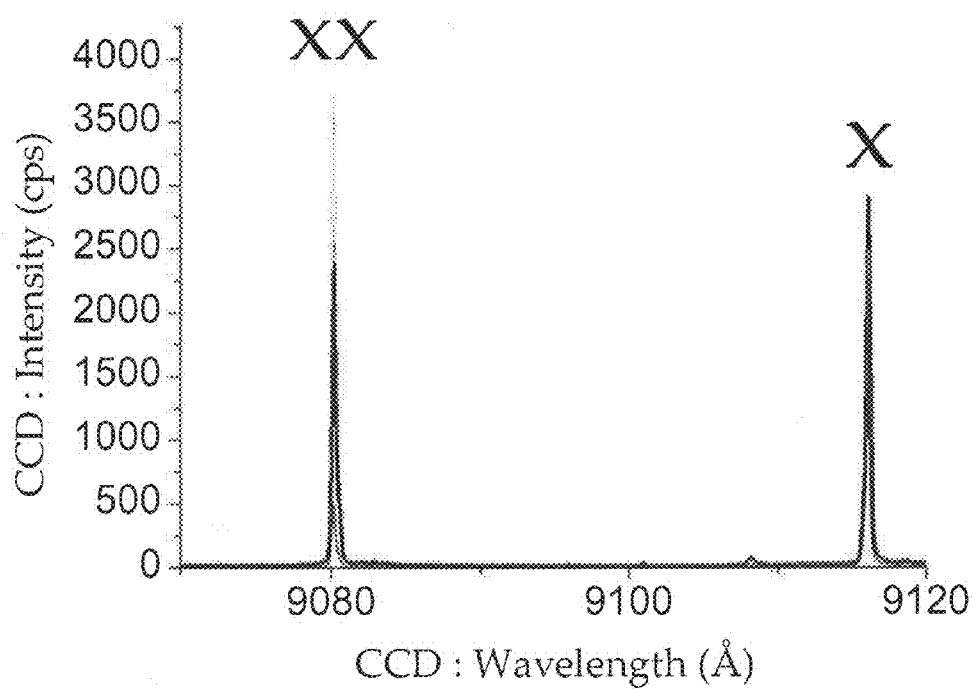
FIG. 9 is a graph of the intensity of the light emitted from the In droplet QDs against wavelength, in Å.
Figure 10:
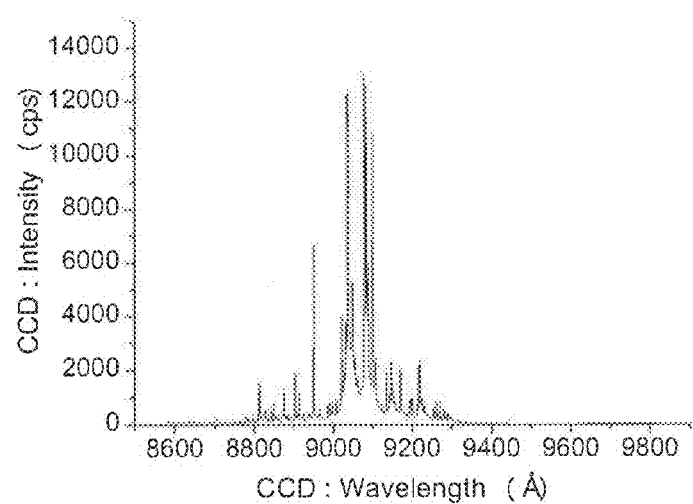
FIG. 10 is a graph of the Intensity of the light emitted from multiple In droplet QDs against wavelength, in Å.

FIGS. 9 and 10 show the optical performance of Indium droplet QDs.

FIG. 9 is a graph of the intensity of the light emitted from the In droplet QDs against wavelength, in Å. There are two large peaks in the spectrum, at around 9080.2 Å and at around 9116.1 Å. The lower wavelength peak corresponds to biexciton emission. The higher wavelength peak corresponds to exciton emission. No wetting layer emission is observed in the spectrum.

FIG. 10 is a graph of the intensity of the light emitted from multiple In droplet QDs against wavelength, in Å. The optical cavity incorporated in this structure enhances light collection for dots closest to 905 nm, the resonant frequency of the cavity. The QDs have statistically small FSS. FIG. 10 is an example of photoluminescent emission from droplet QDs enhanced by a cavity mode. FIG. 10 shows the wide range of emission wavelength. In the wide range of emission wavelength it can be seen that only a few peaks have a larger intensity compared to the ones on the sides. This is the cavity effect.

Figure 11:
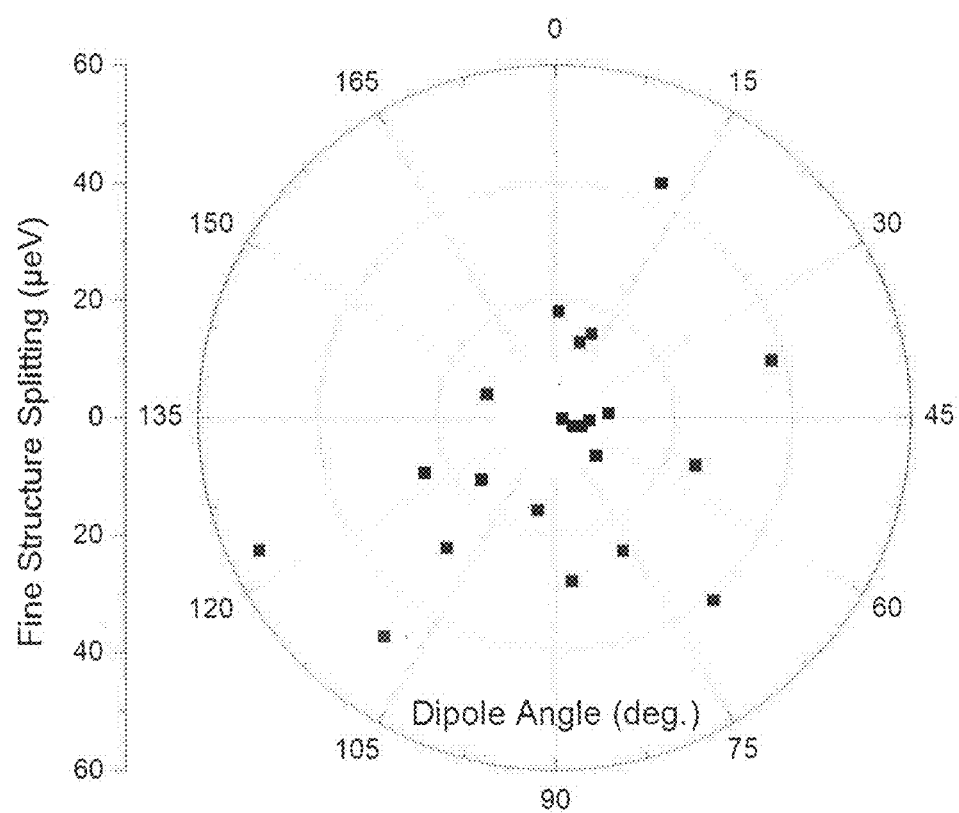
FIG. 11 shows the fine structure splitting in peV of InAs droplet epitaxy quantum dots grown on 001 GaAs substrates.

FIG. 11 shows the fine structure splitting (FSS) of InAs droplet epitaxy quantum dots grown on 001 GaAs substrates, as a function of the dipole emission angle.

The magnitude of the fine structure splitting (FSS) and the orientation of the linearly polarised eigenstates of each quantum dot in the plane of the sample were measured as follows.

Photoluminescence was excited using non-resonant excitation from a laser through a microscope objective lens. The emission from the quantum dots excited by the laser was then collected by the same lens, then passed through a half-wave plate, which rotates the linear polarisation of the collected light relative before passing through a linear polariser positioned at a fixed angle. Spectra were measured using a charge couple device camera and spectrometer, to determine the energy of the exciton and biexciton emission lines of each quantum dot as a function of the half wave plate angle. The measurements were then fitted to determine the magnitude of the FSS, related to the amplitude in the energy variation, and the dipole (or eigenstate) orientation, from the angle corresponding to the lowest recorded exciton energy for each quantum dot.

Sinusoidal fitting to the difference between the biexciton and exciton energies can be employed to improve accuracy, as was the case for the measurements in FIG. 11. The measurement in FIG. 11 was repeated for many quantum dots.

Structural properties of a quantum dot, such as elongation and strain, can cause in-plane asymmetry, resulting in a fine structure splitting of the energy levels of the QD.

The amount of symmetry of the QDs when viewed from above is important for devices designed to emit entangled photons. For such devices, the biexciton state in the quantum dot decays radiatively via the exciton state to the ground state, emitting a pair of photons.

For the case when the Intermediate exciton state is degenerate, the photon pair emitted exist in a superposition state of the two different polarisation outcomes. This two photon state is known as a polarisation entangled state. The measurement of the polarisation of one of the photons will give a random result, but will set the polarisation of the other photon. Such action at a distance has many uses, including in quantum information and quantum imaging.

When structural properties of the QD, such as elongation and strain, cause in-plane asymmetry in the electron-hole exchange interaction, this results in the lifting of the degeneracy of the intermediate exciton state, resulting in a polarisation dependent energy splitting S. For this case, the photons emitted have either linear horizontal, or linear vertical polarisation, and can also be distinguished by their emission energy. The photon pairs emitted are therefore not polarisation entangled when averaged over time, and only classically polarisation correlated. Though entanglement can be recovered by accounting for the delay between biexciton and exciton photon emission, in an embodiment, entanglement is detected in a time-averaged measurement. This is aided by small fine structure splitting comparable to the natural line width of the quantum dot emission, i.e. of less than 5 µeV for a quantum dot with ~1 µeV natural line width, in order to realise an entangled photon pair source.

FIG. 11 shows the fine structure splitting in µeV of InAs droplet epitaxy quantum dots grown on 001 GaAs substrates. The distance of the square points from the centre of the plot indicates the fine structure splitting. The scale is shown on the left hand side of the figure. The scale runs from 0 to 60 µeV. The quantum dots have a range of fine-structure-splitting values, ranging over almost the whole scale. The values are fairly evenly distributed. There are six QDs with values below 10 µeV. There are two QDs with values below 5 µeV. For a device formed with droplet epitaxy QDs, there is therefore a good chance that at least one QD has small FSS i.e. less than 5 µeV.

The graph also shows the alignment directions of the QDs. The alignment direction is indicated by the angle around the plot at which the square marker is located. The angles are in the plane of the layers. The alignment direction Is the direction of the dipole axis of the QD. The graph shows that there is no preferred alignment direction of the quantum dots. This implies that the shape of the QDs is not strongly influenced by the substrate or crystal symmetry. There is no 45 degree range in which over half of the QD alignment directions lie. All 45 degree quadrants contain at least one quantum dot. The distribution of the angles of the dipole axes of the QDs is random.

Figure 12:
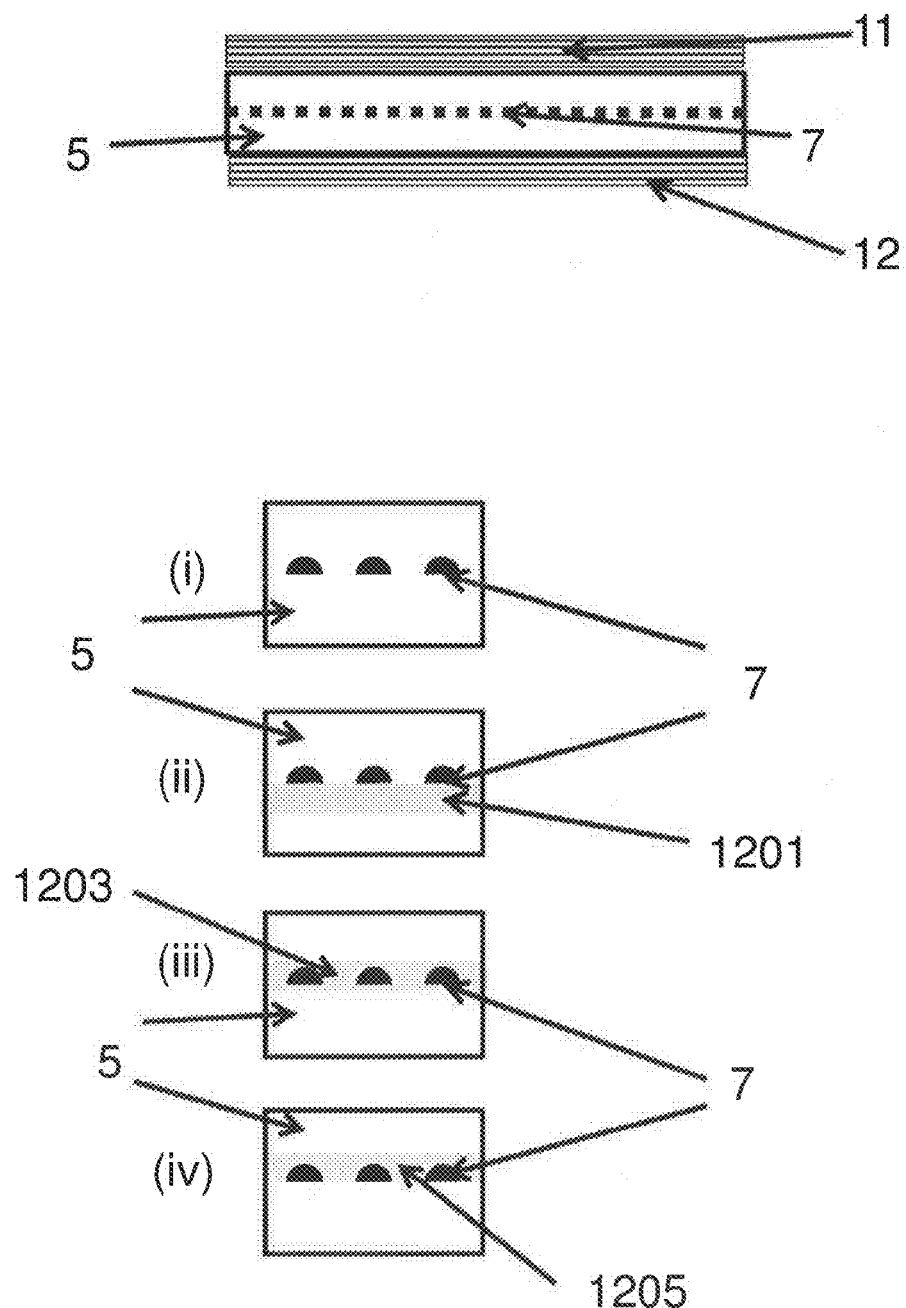
FIG. 12 shows a schematic illustration of a simplified optical device in accordance with an embodiment, and four schematic illustrations of differing structures within the cavity.

FIG. 12 shows a schematic illustration of a simplified optical device in accordance with an embodiment, with a layer of quantum dots formed by the droplet growth mode technique described in relation to FIG. 2, 3, 4 or 5 for example. The photon source has a DBR 12. Provided overlying and in contact with the DBR 12 is the cavity medium 5, which may be GaAs for example. Quantum dots 7 are provided in the cavity medium 5. QDs 7 may be InAs for example. A DBR 11 is provided overlying and in contact with the cavity medium 5.

FIG. 12 also shows five schematic illustrations of differing structures within the cavity. The structures also comprise quantum dots formed by the droplet growth mode technique described in relation to FIG. 2, 3, 4 or 5. The illustrations show a portion of the cavity medium 5 of a device, comprising the QDs 7.

In the device shown in i) the QDs 7 are surrounded by the material of the cavity medium, for example GaAs. Examples of such devices have been described in detail in relation FIGS. 4 and 5.

In ii) the device is modified to have a different barrier below the QDs. The QDs are overlying and in contact with a layer 1202 of a different material to the rest of the cavity medium. Such a device may be formed in the same manner described in relation to FIG. 5(b) for example, with a modification made to step S503. Instead of growing the bottom part of the cavity medium in one step, from one material (for example GaAs), the bottom part of the cavity is grown in two steps. A first part of the bottom part of the cavity is a first material, which is formed overlying and in contact with the lower DBR. A second part of the bottom part of the cavity is formed overlying and in contact with the first part of the bottom part of the cavity. The second part is a different material to the first material. The second part is the layer 1201. The material for layer 1201 may be InGaAs, provided, for example, to relax the strain of the quantum dots grown above. The QDs are formed on the surface of the layer 1201, with steps S504 to S509 being performed as before. The top part of the cavity is formed overlying and in contact with the surface of the layer 1201 and the QDs 7. The top part of the cavity is the first material. The first material may be GaAs for example.

The QDs are in contact with the layer 1201 and the top part of the cavity medium 5 only. The thickness of the layer 1201 is greater than the height of any of the QDs 7. The thickness of the top part of the cavity medium is greater than the height of any of the QDs 7.

In iii) the device is modified such that the QDs is within a DWELL (dots-in-quantum-well) structure. The QDs 7 are in contact with the layer 1203 only. The thickness of the layer 1203 is greater than the height of any of the QDs 7. Layer 1203 may be formed of InGaAs, to provide stronger strain relaxation to an InAs quantum dot within a GaAs matrix. Alternatively, it may be GaAs within an AlAs matrix, designed to provide higher confinement. Such a device may be formed in the same manner described in relation to FIG. 5(b) for example, with the following modification made: layer 1203 is deposited in two stages, the first between S503 and S504, and the second between S507 and S508. The material is grown as a conventional MBE layer, i.e. by epitaxial growth of InGaAs.

In other words, instead of growing the bottom part of the cavity medium in one step (step S503), from one material (for example GaAs), the bottom part of the cavity is grown in two steps. A first part of the bottom part of the cavity is a first material, which is formed overlying and in contact with the lower DBR. A second part of the bottom part of the cavity is formed overlying and in contact with the first part of the bottom part of the cavity. The second part is a different material to the first material. The QDs are formed on the surface of the second part, in steps S504 to S507. The top part of the cavity is formed overlying and in contact with the surface of the second part and the QDs 7. In step S508, instead of growing the top part of the cavity in one step, from one material (for example GaAs) the top part of the cavity is also grown in two steps. A first part of the top part of the cavity is a second material, which is formed overlying and in contact with the bottom part of the cavity medium and the QDs. A second part of the top part of the cavity is formed overlying and in contact with the first part. The second part is a first material. The first material is a different material to the second material. The second part of the bottom part of the cavity and the first part of the top part of the cavity form the layer 1203, which may be InGaAs for example. The first material may be GaAs.

In iv) the device is modified so that the QDs are capped with a layer of a different material 1205. Such a device may be formed in the same manner described in relation to FIG. 5(b) for example, with a modification made to step S508. In step S508, instead of growing the top part of the cavity in one step, from one material (for example GaAs) the top part of the cavity is grown in two steps. A first part of the top part of the cavity is a second material, which is formed overlying and in contact with the bottom part of the cavity medium and the QDs. This part is the layer 1205, which may be InGaAs for example. A second part of the top part of the cavity is formed overlying and in contact with the layer 1205. The second part is a different material to the second material. The second part may be GaAs for example.

The QDs are in contact with the layer 1205 and the bottom part of the cavity medium 5 only. The thickness of the layer 1205 is greater than the height of any of the QDs 7. The thickness of the bottom part of the cavity medium is greater than the height of any of the QDs 7.

Figure 13:
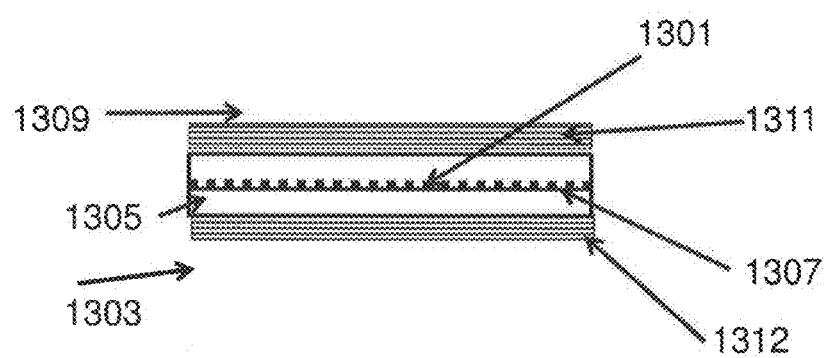
FIG. 13 shows a schematic illustration of a simplified optical device, and five schematic illustrations of differing structures within the cavity.
Figure 13:
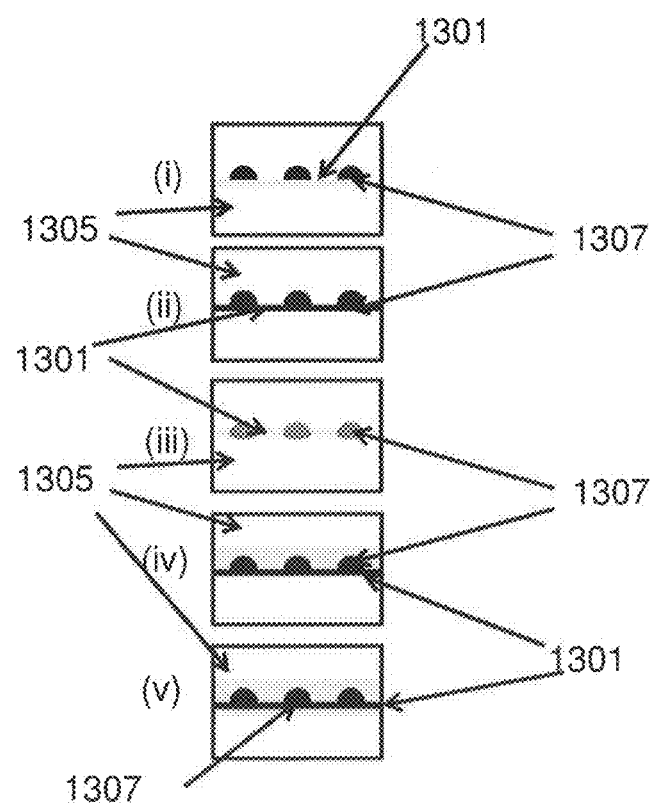

FIG. 13 shows a schematic illustration of a simplified photon source with a layer of quantum dots formed by the Stranski-Krastanov growth described in relation to FIG. 1. The photon source has a DBR 1312. Provided overlying and in contact with the DBR 1312 is a cavity medium 1305, which may be GaAs for example. Quantum dots 1307 are provided in the cavity medium 1305. The QDs are overlying and in contact with a wetting layer 1301. QDs 1307 may be InAs for example. A DBR 1311 is provided overlying and in contact with the cavity medium 1305.

FIG. 13 also shows four schematic illustrations of differing structures comprising quantum dots formed by the Stranski-Krastanov growth described in relation to FIG. 1. The illustrations show a portion of the cavity medium 5 of a device, comprising the QDs.

The QDs are in contact with the wetting layer 1307 for all four structures. The thickness of the wetting layer 1301 is less than the height of any of the QDs 1307.

In the device shown in i), the wetting layer 1301 is intermixed with the barriers. In other words, the wetting layer is a mixture of GaAs and InAs. The barriers are the cavity medium 1305, for example the GaAs surrounding the QDs 1307 and the wetting layer 1303. The QDs 1307 are overlying and in contact with the wetting layer 1301.

In ii) the wetting layer 1303 is the same material as the QD. In iii), the QDs and wetting layer are both intermixed with the barriers. In Iv) the QDs and wetting layer are both intermixed with the barriers and the device also comprises a strain relaxing layer. In v) the QDs are within DWELL structure.

Figure 14:
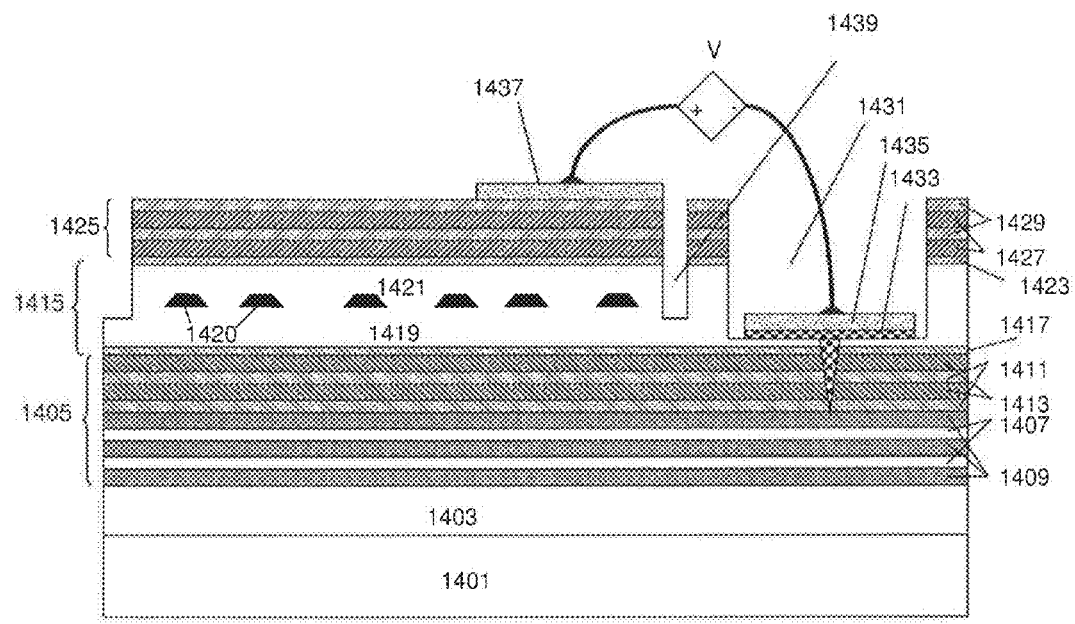
FIG. 14 shows a schematic illustration of an optical device in accordance with an embodiment, which is a photon source.

FIG. 14 is a schematic illustration of a detailed layer structure of a photon source in accordance with an embodiment. The device is grown by MBE and has the following layer structure. An i-GaAs buffer 1403 is grown overlying and in contact with a i-GaAs substrate 1401, i-GaAs is used to refer to undoped GaAs. In one embodiment, the buffer 1403 is 500 nm. In this example, the substrate and buffer are GaAs, but other materials could be used. The bottom DBR 1405 is grown overlying and in contact with the 500 nm i-GaAs buffer 1403. In one embodiment, the bottom DBR 1405 comprises 18 repeats of $\lambda/4$ layers of GaAs 1407 followed by $Al_{0.98}Ga_{0.02}As$ 1409. The top two repeats of GaAs 1411 and $Al_{0.98}Ga_{0.02}As$ 1413 are doped to be n-type with Si to a density of $1.75 \times 10^8$.

In one embodiment, the cavity medium region 1415 has a total optical thickness of $2\lambda$, as follows. For this example, $\lambda$ corresponds to the wavelength of the quantum dot emission of ~905 nm, which is reduced in GaAs due to the higher refractive index compared to air. In one embodiment, to form the cavity medium, firstly a 50 nm thick n-GaAs layer 1417 doped with Si to a density of $1.75 \times 1018$ is formed overlying and in contact with the bottom DBR, followed by ($1\lambda$–50 nm) of i-GaAs which forms the lower barrier 1419 overlying and in contact with the n-GaAs layer 1417.

A layer of droplet epitaxy InAs quantum dots 1420 are fabricated as described with reference to FIG. 2, 3, 4(b) or 5(b) for example, overlying and in contact with the lower barrier 1419.

In one embodiment, layer 1421, comprising ($\lambda$–50 nm) of i-GaAs, completes the intrinsic region and upper barrier, and is formed overlying and in contact with the lower barrier 1419 and the QDs. Layer 1423 comprising 50 nm of p-GaAs doped with C to $10^{18}$, is formed overlying and in contact with the layer 1421 which completes the cavity region 1415.

Finally the top mirror 1425 is formed. In one embodiment, the top mirror 1425 is formed by growth of 6 repeats of $\lambda/4$ layers of $p-Al_{0.98}Ga_{0.02}As$ 1427 followed by p-GaAs 1429. The p-doping was provided by C at a density of $10^{18}$, except for the final 3 nm which was p+ doped by C to $5.6 \times 10^{19}$. The top mirror 1425 is overlying and in contact with the layer 1423.

The device is then processed to provide means to isolate emission from a small number of quantum dots, and to provide means to electrically inject carriers into the quantum dots.

An n-contact window 1431 can be formed using photolithography, and an acid etch using 1:8:80 mixture of sulphuric acid, hydrogen peroxide, and water. In one embodiment, the etch depth of the window is such that it stops 10-15 nm above the n-doped regions. An n-contact 1433 may be formed by depositing 80 nm of gold-germanium-nickel in the n-contact window using photolithography. The contact is annealed so an Ohmic connection extends downwards from the contact to the n-doped regions. Finally 20 nm titanium followed by 80 nm Au 1435 is evaporated on top of the n-contact 1433 to form a bonding surface.

In an embodiment, the p-contact 1437 is formed by evaporation of 20 nm of titanium followed by 80 nm of gold using photolithography.

An isolation etch 1439 may define 220×110 μm mesas by etching down through the p-region and dot layer, stopping in the lower i-GaAs barrier. This can be performed by photolithography and acid etch as described above.

Finally the device is packaged to provide external electrical contacts, and gold bond wires connected the package contacts to the chip contacts.

In the structure of FIG. 14, an InAs quantum dot layer lies at the centre of a 2λ cavity, with a distributed Bragg reflector (DBR) below, and shorter DBR above to form an unbalanced microcavity, to increase emission Intensity in the upward direction. Emission from a single quantum dot (QD) is isolated by the optical collection system. The top DBR is p-doped along with the top part of the cavity, and the top of the bottom DBR is n-doped along with the bottom part of the cavity, to form a p-i-n junction. Electrical contacts allow a bias V to be applied across the undoped intrinsic region incorporating the QD.

To improve the collection efficiency of emitted photons by the device, the active region of the LED device is incorporated within an optical microcavity.

The structure described with reference to FIG. 14 has an optical microcavity which is a planar microcavity, formed by a cavity region of width mλ/2n where λ is similar to the wavelength of the emitted photons, n is the refractive index of the cavity material, and m is an integer. The cavity region is enclosed between two distributed Bragg reflectors (DBRs) formed of multiple repeats of alternating layers of high and low refractive index materials with thickness λ/4n.

Figure 15:
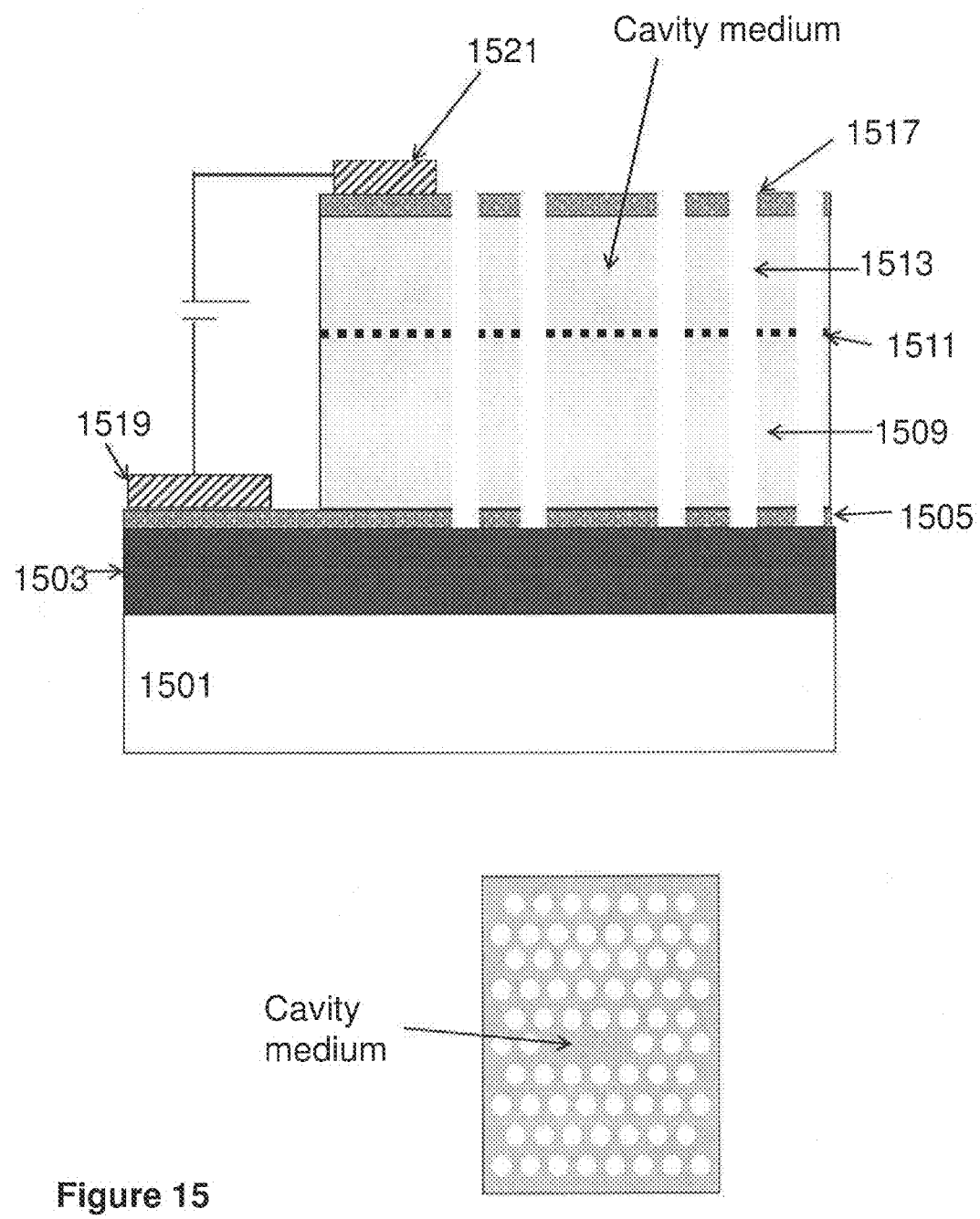
FIG. 15 is a schematic illustration of an optical device in accordance with an embodiment, comprising a photonic crystal.

FIG. 15 is a schematic illustration of an optical device in accordance with an embodiment, comprising a photonic crystal. The cavity is formed by the photonic crystal structure. The reflecting structures are the regions of the photonic crystal either side of the cavity region. The optical device is fabricated using molecular beam epitaxy (MBE).

The device is formed on a substrate 1501. In this example, the substrate is GaAs, but other substrates could be used. The device is formed on the (001) surface of the substrate. A buffer layer 1503 is overlying and in contact with the substrate 1501. A doped layer 1505 is overlying and in contact with the buffer layer 1503. In this particular example, the doped layer 1505 is n-doped GaAs. A GaAs layer 1509 is overlying and in contact with the doped layer 1505.

A plurality of QDs 1511 are overlying and in contact with the GaAs layer 1509. GaAs layer 1509 is the lower part of the medium in the cavity. GaAs layer 1513 is overlying and in contact with the plurality of QDs 1511 and the GaAs layer 1509. GaAs layer 1513 is the upper part of the medium in the cavity structure. Although in this example, the device is based on a GaAs layer having InAs QDs, other materials could be used, for example, InP or GaAs QDs.

The QDs 1511 are in contact with the GaAs layer 1509 and the GaAs layer 1513 only. The thickness of GaAs layer 1509 and the thickness of GaAs layer 1513 are greater than the height of the QDs 1511.

A doped layer 1517 is overlying and in contact with the GaAs layer 1513. In this example, the doped layer is p-doped GaAs.

A plurality of holes extend through the n-doped GaAs layer 1505, the GaAs layer 1509, the GaAs layer 1509 and the doped layer 1517 in a plurality of locations, such that there are a plurality of holes extending through the entire thickness of these layers. In one embodiment, the holes are cylindrical. The height of the cylindrical holes extends through the entire thickness of the n-doped GaAs layer 1505, the GaAs layer 1509, the GaAs layer 1509 and the doped layer 1517.

The cylindrical holes are arranged as a substantially regular lattice. The n-doped GaAs layer 1505, the GaAs layer 1509, the GaAs layer 1509 and the doped layer 1517, having the regular array of cylindrical holes form a photonic crystal slab. The photonic crystal structure is on a portion of the mesa only. In one embodiment, the cylindrical holes are arranged in a hexagonal lattice. Three adjacent holes along a line are omitted, forming a defect in the lattice which is cavity region.

The periodic structure of the holes affects the propagation of light, and forms a photonic bandgap. The light emitted from a quantum dot in the slab falls within this bandgap. Specifically, the holes (which are filled with air) have a different refractive index to GaAs. The periodic change of materials with different refractive index means light having a wavelength within the photonic bandgap can only propagate laterally along the cavity region. The lattice structure therefore causes lateral confinement (i.e. confinement in the plane of the layers) in the cavity region of light emitted from a quantum dot.

A view of the photonic crystal structure from above is shown in the lower figure. The cavity medium region is the region of three omitted adjacent holes along a line. The cavity region may comprise more or less than three omitted holes. The line of holes to the right of the cavity medium region is a first reflecting structure. The line of holes to the left of the cavity medium region is a second reflecting structure, which is on the opposite side of the cavity medium region to the first reflecting structure. The regions of holes on either of the elongate sides of the cavity medium region are also reflecting structures on opposite sides of the cavity medium region.

An electrode 1519 is contacted to the doped layer 1505, and an electrode 1521 is contacted to the doped layer 1517 as before.

The cavity is configured for out of plane emission. In alternative embodiments, the cavity is configured for in-plane emission.

The optical device may be fabricated according to the method of described in relation to FIG. 4(b), with the following modifications.

Steps S403 and S410 are omitted.

Between steps S415 and S416, the following steps may be performed.

A resist is spun on top of the entire structure. A design mask is transferred to the resist using lithography. The design mask is then developed by using an appropriate chemical to remove the regions of the resist (the holes) that have been exposed. In one embodiment, the design mask has a regular lattice of circular holes, with adjacent holes along a line omitted forming a defect part of the lattice which is a cavity region.

Etching is used to etch the design into the device through the lithography mask. The etching depth is set to be just over the thickness of the n-doped GaAs layer 1505, the GaAs layer 1509, the GaAs layer 1509 and the doped layer 1517, in order to reach the buffer layer 1503. The etching forms the photonic crystal waveguide slab. The resist is then removed.

Optical devices such as have been described above have application in quantum entanglement devices and quantum relay devices.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. An optical device comprising:
    a substrate; and a cavity structure on the substrate, wherein: the cavity structure comprises a cavity medium between two reflecting structures, the cavity medium comprising a plurality of quantum emitters in contact with one or more semiconductor layers; wherein the one or more semiconductor layers have a thickness larger than the height of the quantum emitters; the cavity structure is on a 001 orientated surface of the substrate; the density of the quantum emitters is less than 20 $\mu m^{-2}$; and the reflecting structures are at least one of distributed Bragg reflectors, distributed feedback gratings, or regions of a photonic crystal.

2. The optical device according to claim 1, wherein the quantum emitter is formed by depositing isolated droplets of a first, metallic, material and supplying a second, group V, material such that the second material reacts with the droplets of the first material.

3. The optical device according to claim 1, wherein the height of the quantum emitter is greater than 3 nm.

4. The optical device according to claim 1, wherein the longest dimension of the quantum emitter in the plane of the layers is greater than 3 nm.

5. The optical device according to claim 1, comprising a quantum emitter layer having a plurality of quantum emitters with a random distribution in the direction of dipole axis.

6. The optical device according to claim 1, comprising a quantum emitter layer having a plurality of quantum emitters with a random distribution in the fine structure splitting.

7. The optical device according to claim 1, wherein the fine structure splitting of at least one of the quantum emitters is less than 10 $\mu eV$.

8. The optical device according to claim 1, wherein the density of the quantum emitters is less than 10 emitters/$\mu m^2$.

9. The optical device according to claim 1, wherein said device comprises at least one compound comprising: Ga, In, or Al; in combination with As or P.

10. The optical device of claim 1, wherein there is no wetting layer in contact with the quantum emitter.

11. The optical device of claim 1, wherein the quantum emitter is optically excited and the optical device comprises a laser configured to optically excite the quantum emitter.

12. The optical device of claim 1, wherein the quantum emitter is electrically excited and the optical device further comprises electrical contacts configured to electrically excite the quantum emitter.

13. The optical device of claim 1, wherein the device is an entangled photon source.

14. A method for forming an optical device comprising the steps of:
    forming a first reflecting structure on a substrate;
    depositing isolated droplets of a first, metallic, material and controlling the deposition temperature so that the density of the droplets is less than 20 $\mu m^{-2}$;
    supplying a second, group V, material such that the second material reacts with the droplets of the first material to form a plurality of quantum emitters in contact with one or more semiconductor layers such that the semiconductor layers have a thickness larger than the height of the quantum emitters; and
    forming a second reflecting structure, wherein;
        the first reflecting structure and the second reflecting structure define a cavity structure; and
        the cavity structure is on a 001 orientated surface of the substrate.

15. A method according to claim 14, further comprising the steps of:
    forming a first doped layer between the substrate and the first reflecting structure;
    forming a second doped layer overlying and in contact with the second reflecting structure;
    contacting a first electrode to the first doped layer and a second electrode to the second doped layer to form a p-i-n junction.

16. A method according to claim 14, wherein the first reflecting structure and second reflecting structure are distributed Bragg reflectors.

17. A method according to claim 14, wherein the devise comprises at least one compound comprising Ga, In, or Al, in combination with As or P.

18. A method according to claim 17, wherein the deposition temperature ranges between 80° C. and 360° C.

* * * * *